(12) United States Patent
Mostert

(10) Patent No.: US 10,374,955 B2
(45) Date of Patent: Aug. 6, 2019

(54) MANAGING NETWORK COMPUTING COMPONENTS UTILIZING REQUEST ROUTING

(71) Applicant: Amazon Technologies, Inc., Seattle, WA (US)

(72) Inventor: André Mostert, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/935,615

(22) Filed: Mar. 26, 2018

(65) Prior Publication Data

US 2018/0212880 A1 Jul. 26, 2018

Related U.S. Application Data

(63) Continuation of application No. 15/075,728, filed on Mar. 21, 2016, now Pat. No. 9,929,959, which is a
(Continued)

(51) Int. Cl.
*G06F 15/16* (2006.01)
*H04L 12/801* (2013.01)
(Continued)

(52) U.S. Cl.
CPC ......... *H04L 47/12* (2013.01); *G06F 9/45558* (2013.01); *G06F 16/95* (2019.01);
(Continued)

(58) Field of Classification Search
CPC ......... H04L 67/10; H04L 67/02; H04L 67/28; H04L 51/32; H04L 63/1416; H04L 63/10;
(Continued)

(56) References Cited

U.S. PATENT DOCUMENTS 5,063,500 A 11/1991 Shorter
5,341,477 A 8/1994 Pitkin et al.
(Continued)

FOREIGN PATENT DOCUMENTS

CA 2741 895 A1 5/2010
CN 1422468 A 6/2003
(Continued)

OTHER PUBLICATIONS

"Non-Final Office Action dated Jan. 3, 2012," U.S. Appl. No. 12/652,541, filed Jan. 3, 2012; 35 pages.
(Continued)

*Primary Examiner* — Richard G Keehn
(74) *Attorney, Agent, or Firm* — Knobbe, Martens, Olson & Bear, LLP

(57) ABSTRACT

Aspects of the disclosure will be described with regard to the processing of a client computing device DNS queries by a DNS processing service to determine an identifier associated with a previously instantiated hosted virtual machine instance. In one aspect, if the previously instantiated hosted virtual machine instance is instantiated, the DNS service can resolve the DNS query by transmitting network address information associated with the previously instantiated hosted virtual machine instance. In another aspect, if the previously instantiated hosted virtual machine instance is not instantiated, the DNS service can initiate a process to cause an instantiation of a hosted virtual machine instance based on the previously instantiated hosted virtual machine instance. The DNS service can then resolve the DNS query by transmitting network address information, or an alternative identifier, associated with the newly instantiated hosted virtual machine instance.

22 Claims, 8 Drawing Sheets

Related U.S. Application Data continuation of application No. 13/909,705, filed on Jun. 4, 2013, now Pat. No. 9,294,391.

(51) Int. Cl.

| | | |
|---|---|---|
| *H04L 29/06* | (2006.01) | |
| *G06F 9/455* | (2018.01) | |
| *H04L 12/24* | (2006.01) | |
| *H04L 12/717* | (2013.01) | |
| *H04L 12/58* | (2006.01) | |
| *H04L 29/08* | (2006.01) | |
| *H04L 12/26* | (2006.01) | |
| *H04L 12/18* | (2006.01) | |
| *H04L 12/911* | (2013.01) | |
| *H04L 12/813* | (2013.01) | |
| *G06F 16/95* | (2019.01) | |
| *H04L 29/12* | (2006.01) | |

(52) U.S. Cl.
CPC .......... *H04L 12/1813* (2013.01); *H04L 41/04* (2013.01); *H04L 41/046* (2013.01); *H04L 41/0803* (2013.01); *H04L 41/0896* (2013.01); *H04L 41/12* (2013.01); *H04L 43/04* (2013.01); *H04L 45/42* (2013.01); *H04L 47/20* (2013.01); *H04L 47/70* (2013.01); *H04L 51/32* (2013.01); *H04L 61/1511* (2013.01); *H04L 61/303* (2013.01); *H04L 63/10* (2013.01); *H04L 63/102* (2013.01); *H04L 63/20* (2013.01); *H04L 67/02* (2013.01); *H04L 67/10* (2013.01); *H04L 67/28* (2013.01); *G06F 2009/4557* (2013.01); *G06F 2009/45595* (2013.01); *H04L 63/1416* (2013.01)

(58) Field of Classification Search
CPC ......... H04L 63/20; H04L 43/04; H04L 47/12; H04L 47/20; H04L 47/70; H04L 12/1813; H04L 41/04; H04L 41/046; H04L 41/0803

See application file for complete search history.

(56) References Cited

U.S. PATENT DOCUMENTS

| | | | |
|---|---|---|---|
| 5,459,837 A | 10/1995 | Caccavale | |
| 5,611,049 A | 3/1997 | Pitts | |
| 5,701,467 A | 12/1997 | Freeston | |
| 5,764,910 A | 6/1998 | Shachar | |
| 5,774,660 A | 6/1998 | Brendel et al. | |
| 5,852,717 A | 12/1998 | Bhide et al. | |
| 5,892,914 A | 4/1999 | Pitts | |
| 5,893,116 A | 4/1999 | Simmonds et al. | |
| 5,895,462 A | 4/1999 | Toki | |
| 5,905,248 A | 5/1999 | Russell et al. | |
| 5,933,811 A | 8/1999 | Angles et al. | |
| 5,937,427 A | 8/1999 | Shinagawa et al. | |
| 5,974,454 A | 10/1999 | Apfel et al. | |
| 5,991,306 A | 11/1999 | Burns et al. | |
| 5,999,274 A | 12/1999 | Lee et al. | |
| 6,016,512 A | 1/2000 | Huitema | |
| 6,018,619 A | 1/2000 | Allard et al. | |
| 6,026,452 A | 2/2000 | Pitts | |
| 6,038,601 A | 3/2000 | Lambert et al. | |
| 6,052,718 A | 4/2000 | Gifford | |
| 6,078,960 A | 6/2000 | Ballard | |
| 6,085,234 A | 7/2000 | Pitts et al. | |
| 6,092,100 A | 7/2000 | Berstis et al. | |
| 6,098,096 A | 8/2000 | Tsirigotis et al. | |
| 6,108,703 A | 8/2000 | Leighton et al. | |
| 6,128,279 A | 10/2000 | O'Neil et al. | |
| 6,151,631 A | 11/2000 | Ansell et al. | |
| 6,157,942 A | 12/2000 | Chu et al. | |
| 6,167,438 A | 12/2000 | Yates et al. | |
| 6,167,446 A | 12/2000 | Lister et al. | |
| 6,173,316 B1 | 1/2001 | De Boor et al. | |
| 6,182,111 B1 | 1/2001 | Inohara et al. | |
| 6,182,125 B1 | 1/2001 | Borella et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,223,288 B1 | 4/2001 | Byrne | |
| 6,243,761 B1 | 6/2001 | Mogul et al. | |
| 6,275,496 B1 | 8/2001 | Burns et al. | |
| 6,286,043 B1 | 9/2001 | Cuomo et al. | |
| 6,286,084 B1 | 9/2001 | Wexler et al. | |
| 6,304,913 B1 | 10/2001 | Rune | |
| 6,324,580 B1 | 11/2001 | Jindal et al. | |
| 6,330,602 B1 | 12/2001 | Law et al. | |
| 6,338,082 B1 | 1/2002 | Schneider | |
| 6,345,308 B1 | 2/2002 | Abe | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1 | 4/2002 | Scharber et al. | |
| 6,377,257 B1 | 4/2002 | Borrel et al. | |
| 6,386,043 B1 | 5/2002 | Millins | |
| 6,389,532 B1 | 5/2002 | Gupta et al. | |
| 6,405,252 B1 | 6/2002 | Gupta et al. | |
| 6,408,360 B1 | 6/2002 | Chamberlain et al. | |
| 6,411,967 B1 | 6/2002 | Van Renesse | |
| 6,415,280 B1 | 7/2002 | Farber et al. | |
| 6,430,607 B1 | 8/2002 | Kavner | |
| 6,438,592 B1 | 8/2002 | Killian | |
| 6,442,165 B1 | 8/2002 | Sitaraman et al. | |
| 6,452,925 B1 | 9/2002 | Sistanizadeh et al. | |
| 6,457,047 B1 | 9/2002 | Chandra et al. | |
| 6,459,909 B1 | 10/2002 | Bilcliff et al. | |
| 6,473,804 B1 | 10/2002 | Kaiser et al. | |
| 6,484,143 B1 | 11/2002 | Swildens et al. | |
| 6,484,161 B1 | 11/2002 | Chipalkatti et al. | |
| 6,493,765 B1 | 12/2002 | Cunningham et al. | |
| 6,505,241 B2 | 1/2003 | Pitts | |
| 6,523,036 B1 | 2/2003 | Hickman et al. | |
| 6,529,910 B1 | 3/2003 | Fleskes | |
| 6,529,953 B1 | 3/2003 | Van Renesse | |
| 6,553,413 B1 | 4/2003 | Leighton et al. | |
| 6,560,610 B1 | 5/2003 | Eatherton et al. | |
| 6,611,873 B1 | 8/2003 | Kanehara | |
| 6,622,168 B1 | 9/2003 | Datta | |
| 6,643,357 B2 | 11/2003 | Lumsden | |
| 6,643,707 B1 | 11/2003 | Booth | |
| 6,654,807 B2 | 11/2003 | Farber et al. | |
| 6,658,462 B1 | 12/2003 | Dutta | |
| 6,665,706 B2 | 12/2003 | Kenner et al. | |
| 6,678,717 B1 | 1/2004 | Schneider | |
| 6,678,791 B1 | 1/2004 | Jacobs et al. | |
| 6,681,282 B1 | 1/2004 | Golden et al. | |
| 6,694,358 B1 | 2/2004 | Swildens et al. | |
| 6,697,805 B1 | 2/2004 | Choquier et al. | |
| 6,718,324 B2 | 4/2004 | Edlund et al. | |
| 6,724,770 B1 | 4/2004 | Van Renesse | |
| 6,732,237 B1 | 5/2004 | Jacobs et al. | |
| 6,754,699 B2 | 6/2004 | Swildens et al. | |
| 6,754,706 B1 | 6/2004 | Swildens et al. | |
| 6,760,721 B1 | 7/2004 | Chasen et al. | |
| 6,769,031 B1 | 7/2004 | Bero | |
| 6,782,398 B1 | 8/2004 | Bahl | |
| 6,785,704 B1 | 8/2004 | McCanne | |
| 6,795,434 B1 | 9/2004 | Kumar et al. | |
| 6,799,214 B1 | 9/2004 | Li | |
| 6,804,706 B2 | 10/2004 | Pitts | |
| 6,810,291 B2 | 10/2004 | Card et al. | |
| 6,810,411 B1 | 10/2004 | Coughlin et al. | |
| 6,829,654 B1 | 12/2004 | Jungck | |
| 6,862,607 B1 | 3/2005 | Vermeulen | |
| 6,868,439 B2 | 3/2005 | Basu et al. | |
| 6,874,017 B1 | 3/2005 | Inoue et al. | |
| 6,917,951 B2 | 7/2005 | Orbits et al. | |
| 6,925,499 B1 | 8/2005 | Chen et al. | |
| 6,928,467 B2 | 8/2005 | Peng et al. | |

(56) References Cited

U.S. PATENT DOCUMENTS

| | | |
|---|---|---|
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 6/2006 | Gnagy et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,593,935 B2 | 9/2009 | Sullivan |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |

(56) References Cited

U.S. PATENT DOCUMENTS

| | | |
|---|---|---|
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1 | 5/2012 | Ostermeyer et al. |
| 8,190,682 B2 | 5/2012 | Paterson-Jones et al. |
| 8,195,837 B2 | 6/2012 | McCarthy et al. |
| 8,209,695 B1 | 6/2012 | Pruyne et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,600 B1 | 10/2012 | Helmick et al. |
| 8,301,645 B1 | 10/2012 | Crook |
| 8,321,568 B2 | 11/2012 | Sivasubramanian et al. |
| 8,380,831 B2 | 2/2013 | Barber |
| 8,380,851 B2 | 2/2013 | McCarthy et al. |
| 8,402,137 B2 | 3/2013 | Sivasuramanian et al. |
| 8,423,408 B2 | 4/2013 | Barnes et al. |
| 8,423,662 B1 | 4/2013 | Weihl et al. |
| 8,433,749 B2 | 4/2013 | Wee et al. |
| 8,443,167 B1 | 5/2013 | Fallone et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,658 B2 | 9/2013 | Holmes et al. |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,812,727 B1 | 8/2014 | Sorenson, III et al. |
| 8,819,283 B2 | 8/2014 | Richardson et al. |
| 8,826,032 B1 | 9/2014 | Yahalom et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,972,580 B2 | 3/2015 | Fleischman et al. |
| 9,003,035 B1 | 4/2015 | Richardson et al. |
| 9,003,040 B2 | 4/2015 | MacCarthaigh et al. |

(56) References Cited

U.S. PATENT DOCUMENTS

| | | |
|---|---|---|
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,777 B1 | 7/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B1 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,832,141 B1 | 11/2017 | Raftery |
| 9,871,794 B2 | 1/2018 | Joffe et al. |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B1 | 7/2018 | Mizik et al. |
| 10,049,051 B1 | 8/2018 | Baldwin |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |

(56) References Cited

U.S. PATENT DOCUMENTS

| | | |
|---|---|---|
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 6/2004 | Haneda et al. |
| 2004/0117309 A1 | 6/2004 | Inoue et al. |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |

(56) References Cited

U.S. PATENT DOCUMENTS

| | | |
|---|---|---|
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0198170 A1 | 9/2005 | LeMay et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0064610 A1 | 3/2007 | Khandani |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |

(56) References Cited

U.S. PATENT DOCUMENTS

| | | |
|---|---|---|
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |

(56) References Cited

U.S. PATENT DOCUMENTS

| | | |
|---|---|---|
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0070700 A1 | 3/2010 | Borst et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0182290 A1 | 7/2011 | Perkins |
| 2011/0191445 A1 | 8/2011 | Dazzi |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1* | 8/2011 | Jorgensen ............ G06F 9/54 715/733 |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0023090 A1 | 1/2012 | Holloway et al. |
| 2012/0023226 A1 | 1/2012 | Petersen et al. |
| 2012/0036238 A1 | 2/2012 | Sundaram et al. |
| 2012/0041970 A1 | 2/2012 | Ghosh et al. |
| 2012/0066360 A1 | 3/2012 | Ghosh |
| 2012/0072600 A1 | 3/2012 | Richardson et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 5/2012 | Abramoff et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 6/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1* | 7/2012 | Richardson .......... H04L 61/301 709/219 |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0198071 A1 | 8/2012 | Black et al. |
| 2012/0224516 A1 | 9/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |

(56) References Cited

U.S. PATENT DOCUMENTS

| | | |
|---|---|---|
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 10/2012 | Kim et al. |
| 2012/0257628 A1 | 10/2012 | Bu et al. |
| 2012/0259954 A1 | 10/2012 | McCarthy et al. |
| 2012/0278229 A1 | 11/2012 | Vishwanathan et al. |
| 2012/0278831 A1 | 11/2012 | van Coppenolle et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1* | 1/2013 | Trahan .................. H04L 67/40 709/223 |
| 2013/0007273 A1 | 1/2013 | Baumback et al. |
| 2013/0019311 A1 | 1/2013 | Swildens et al. |
| 2013/0034099 A1 | 2/2013 | Hikichi et al. |
| 2013/0041872 A1 | 2/2013 | Aizman et al. |
| 2013/0046869 A1 | 2/2013 | Jenkins et al. |
| 2013/0054675 A1 | 2/2013 | Jenkins et al. |
| 2013/0055374 A1 | 2/2013 | Kustarz et al. |
| 2013/0067530 A1 | 3/2013 | Spektor et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 4/2013 | Bhogal et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 6/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 9/2013 | Green et al. |
| 2013/0254269 A1 | 9/2013 | Sivasubramanian et al. |
| 2013/0254879 A1 | 9/2013 | Chesla et al. |
| 2013/0263256 A1 | 10/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0305046 A1 | 11/2013 | Mankovski et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0339429 A1 | 12/2013 | Richardson et al. |
| 2013/0346567 A1 | 12/2013 | Richardson et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0036675 A1 | 2/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059379 A1 | 2/2014 | Ren et al. |
| 2014/0082165 A1 | 3/2014 | Marr et al. |
| 2014/0082614 A1 | 3/2014 | Klein et al. |
| 2014/0089917 A1 | 3/2014 | Attalla et al. |
| 2014/0108672 A1 | 4/2014 | Ou et al. |
| 2014/0122698 A1 | 5/2014 | Batrouni et al. |
| 2014/0122725 A1 | 5/2014 | Batrouni et al. |
| 2014/0137111 A1 | 5/2014 | Dees et al. |
| 2014/0149601 A1 | 5/2014 | Carney et al. |
| 2014/0164817 A1 | 6/2014 | Bartholomy et al. |
| 2014/0165061 A1 | 6/2014 | Greene et al. |
| 2014/0215019 A1 | 7/2014 | Ahrens |
| 2014/0244937 A1 | 8/2014 | Bloomstein et al. |
| 2014/0269371 A1 | 9/2014 | Badea et al. |
| 2014/0280606 A1 | 9/2014 | Long |
| 2014/0280679 A1 | 9/2014 | Dey et al. |
| 2014/0297870 A1 | 10/2014 | Eggleston et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0088972 A1 | 3/2015 | Brand et al. |
| 2015/0089621 A1 | 3/2015 | Khalid |
| 2015/0106864 A1 | 4/2015 | Li et al. |
| 2015/0154051 A1 | 6/2015 | Kruglick |
| 2015/0156279 A1 | 6/2015 | Vaswani et al. |
| 2015/0172379 A1 | 6/2015 | Richardson et al. |
| 2015/0172414 A1 | 6/2015 | Richardson et al. |
| 2015/0172415 A1 | 6/2015 | Richardson et al. |
| 2015/0188734 A1 | 7/2015 | Petrov |
| 2015/0189042 A1 | 7/2015 | Sun et al. |
| 2015/0200991 A1 | 7/2015 | Kwon |
| 2015/0207733 A1 | 7/2015 | Richardson et al. |
| 2015/0215656 A1 | 7/2015 | Pulung et al. |
| 2015/0229710 A1 | 8/2015 | Sivasubramanian et al. |
| 2015/0244580 A1 | 8/2015 | Saavedra |
| 2015/0256647 A1 | 9/2015 | Richardson et al. |
| 2015/0288647 A1 | 10/2015 | Chhabra et al. |
| 2015/0319260 A1 | 11/2015 | Watson |
| 2015/0358276 A1 | 12/2015 | Liu et al. |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028755 A1 | 1/2016 | Vasseur et al. |
| 2016/0036857 A1 | 2/2016 | Foxhoven et al. |
| 2016/0041910 A1 | 2/2016 | Richardson et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0132600 A1 | 5/2016 | Woodhead et al. |
| 2016/0142251 A1 | 5/2016 | Contreras et al. |
| 2016/0182454 A1 | 6/2016 | Phonsa et al. |
| 2016/0182542 A1 | 6/2016 | Staniford |
| 2016/0241637 A1 | 8/2016 | Marr et al. |
| 2016/0241639 A1 | 8/2016 | Brookins et al. |
| 2016/0253262 A1 | 9/2016 | Nadgowda |
| 2016/0274929 A1 | 9/2016 | King |
| 2016/0294678 A1 | 10/2016 | Khakpour et al. |
| 2016/0366202 A1 | 12/2016 | Phillips et al. |
| 2017/0041428 A1 | 2/2017 | Katsev |
| 2017/0109316 A1 | 4/2017 | Hack et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0155732 A1 | 6/2017 | Araújo et al. |
| 2017/0171146 A1 | 6/2017 | Sharma et al. |
| 2017/0180217 A1 | 6/2017 | Puchala et al. |
| 2017/0180267 A1 | 6/2017 | Puchala et al. |
| 2017/0214761 A1 | 7/2017 | Hsu et al. |
| 2017/0250821 A1 | 8/2017 | Richardson et al. |
| 2017/0257340 A1 | 9/2017 | Richardson et al. |
| 2017/0353395 A1 | 12/2017 | Richardson et al. |
| 2018/0063027 A1 | 3/2018 | Rafferty |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |
| 2018/0159757 A1 | 6/2018 | Uppal et al. |

(56) References Cited

U.S. PATENT DOCUMENTS

| | | | |
|---|---|---|---|
| 2018/0159769 | A1 | 6/2018 | Richardson et al. |
| 2018/0167444 | A1 | 6/2018 | Sivasubramanian et al. |
| 2018/0167469 | A1 | 6/2018 | Sivasubramanian et al. |
| 2018/0183689 | A1 | 6/2018 | Ellsworth et al. |
| 2018/0191817 | A1 | 7/2018 | Richardson et al. |
| 2018/0213052 | A1 | 7/2018 | Maccarthaigh et al. |
| 2018/0278717 | A1 | 9/2018 | Richardson et al. |
| 2018/0287916 | A1 | 10/2018 | Mizik et al. |
| 2018/0302322 | A1 | 10/2018 | Richardson et al. |
| 2018/0332107 | A1 | 11/2018 | Marr et al. |

FOREIGN PATENT DOCUMENTS

| | | | |
|---|---|---|---|
| CN | 1511399 | A | 7/2004 |
| CN | 1605182 | A | 4/2005 |
| CN | 101189598 | A | 5/2008 |
| CN | 101460907 | A | 6/2009 |
| CN | 103731481 | A | 4/2014 |
| EP | 1603307 | A2 | 12/2005 |
| EP | 1351141 | A2 | 10/2007 |
| EP | 2008167 | A2 | 12/2008 |
| EP | 3156911 | A1 | 4/2017 |
| JP | 07-141305 | | 6/1995 |
| JP | 2001-0506093 | | 5/2001 |
| JP | 2001-249907 | | 9/2001 |
| JP | 2002-024192 | | 1/2002 |
| JP | 2002-044137 | | 2/2002 |
| JP | 2002-323986 | | 11/2002 |
| JP | 2003-167810 | A | 6/2003 |
| JP | 2003-167813 | A | 6/2003 |
| JP | 2003-188901 | A | 7/2003 |
| JP | 2003-522358 | A | 7/2003 |
| JP | 2004-070935 | | 3/2004 |
| JP | 2004-532471 | | 10/2004 |
| JP | 2004-533738 | A | 11/2004 |
| JP | 2005-537687 | | 12/2005 |
| JP | 2007-133896 | A | 5/2007 |
| JP | 2007-207225 | A | 8/2007 |
| JP | 2008-515106 | A | 5/2008 |
| JP | 2009-071538 | A | 4/2009 |
| JP | 2012-509623 | | 4/2012 |
| JP | 2012-209623 | | 10/2012 |
| WO | WO 2002/069608 | A2 | 9/2002 |
| WO | WO 2005/071560 | A1 | 8/2005 |
| WO | WO 2007/007960 | A1 | 1/2007 |
| WO | WO 2007/126837 | A2 | 11/2007 |
| WO | WO 2009124006 | A2 | 10/2009 |
| WO | WO 2010/002603 | A1 | 1/2010 |
| WO | WO 2012/044587 | | 4/2012 |
| WO | WO 2012065641 | A1 | 5/2012 |
| WO | WO 2014/047073 | A1 | 3/2014 |
| WO | WO 2017/106455 | A1 | 6/2017 |

OTHER PUBLICATIONS

"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.

"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 20102]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

(56) References Cited

OTHER PUBLICATIONS

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

Gruener, J., "A Vision of Togetherness," May 24, 2004, NetworkWorld, retrieved May 3, 2006, from, http://www.networkworld.com/supp/2004/ndc3/0524virt.html, 9 pages.

Gunther et al, "Measuring Round Trip Times to determine the Distance between WLAN Nodes",May 2005, In Proc. of Networking 2005, all pages.

Gunther et al, "Measuring Round Trip Times to determine the Distance between WLAN Nodes", Dec. 18, 2004, Technical University Berlin, all pages.

Guo, F., Understanding Memory Resource Management in Vmware vSphere 5.0, Vmware, 2011, pp. 1-29.

Hameed, CC, "Disk Fragmentation and System Performance", Mar. 14, 2008, 3 pages.

Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.

Horvath et al., "Enhancing Energy Efficiency in Multi-tier Web Server Clusters via Prioritization," in Parallel and Distributed Processing Symposium, 2007. IPDPS 2007. IEEE International, vol., No., pp. 1-6, Mar. 26-30, 2007.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.

Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.

Kenshi, P., "Help File Library: Iptables Basics," Justlinux, retrieved Dec. 1, 2005, from http://www.justlinux.com/nhf/Security/Iptables_Basics.html, 4 pages.

Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.

Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.

Liu et al., "Combined mining of Web server logs and web contents for classifying user navigation patterns and predicting users' future requests," Data & Knowledge Engineering 61 (2007) pp. 304-330.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.

Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.

Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Sharif et al, "Secure In-VM Monitoring Using Hardware Virtualization", Microsoft, Oct. 2009 http://research.microsoft.com/pubs/153179/sim-cc509.pdf; 11 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtual Iron, retrieved May 3, 2006, from http://www.virtualiron.com/, 1 page.

Waldspurger, CA., "Spawn: A Distributed Computational Economy," Feb. 1992, IEEE Transactions on Software Engineering, 18(2): 103-117, 15 pages.

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

Xu et al., "Decision tree regression for soft classification of remote sensing data", Remote Sensing of Environment 97 (2005) pp. 322-336.

Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.

Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

Supplementary European Search Report in Application No. 09729072.0 2266064 dated Dec. 10, 2014.

First Singapore Written Opinion in Application No. 201006836-9, dated Oct. 12, 2011 in 12 pages.

Singapore Written Opinion in Application No. 201006836-9, dated Apr. 30, 2012 in 10 pages.

First Office Action in Chinese Application No. 200980111422.3 dated Apr. 13, 2012.

First Office Action in Japanese Application No. 2011-502138 dated Feb. 1, 2013.

(56) References Cited

OTHER PUBLICATIONS

Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.

(56) References Cited

OTHER PUBLICATIONS

Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Search Report and Written Opinion in PCT/US2017/055156 dated Dec. 13, 2017.
Arends et al., DNS Security Introduction and Requirements, RFC 4033, Mar. 2005, 21 pages.
Ariyapperuma et al., "Security Vulnerabilities in DNS and DNS-SEC." The Second International Conference on Availability, Reliability and Security, IEEE, 2007, 8 pages.
Chandramouli et al., "Challenges in Securing the Domain Name System." IEEE Security & Privacy4.1 (2006),pp. 84-87.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Eastlake, Donald, Domain Name System Security Extensions, RFC 2535, Mar. 1999, 47 pages.
JH Software, Moving a DNS Server to a New IP Address, last updated Jan. 26, 2006, 1 page.
Office Action in European Application No. 11767118.0 dated Jul. 25, 2018.
Extended Search Report in European Application No. 18156163 dated Sep. 3, 2018.
Office Action in Chinese Application No. 2013800492635 dated Aug. 30, 2017.
Office Action issued in connection with U.S. Appl. No. 12/059,997 dated Jun. 9, 2010.
Final Office Action issued in connection with U.S. Appl. No. 12/059,997 dated Jan. 7, 2011.
Office Action issued in connection with U.S. Appl. No. 13/419,233 dated Jan. 9, 2014.
Final Office Action issued in connection with U.S. Appl. No. 13/419,233 dated Aug. 19, 2014.
Office Action issued in connection with U.S. Appl. No. 13/419,233 dated Jan. 2, 2015.
Final Office Action issued in connection with U.S. Appl. No. 13/419,233 dated Apr. 24, 2015.
Office Action issued in connection with U.S. Appl. No. 13/419,233 dated Aug. 28, 2015.
Final Office Action issued in connection with U.S. Appl. No. 13/419,233 dated Feb. 12, 2016.
Office Action issued in connection with U.S. Appl. No. 12/060,013 dated Dec. 1, 2009.
Final Office Action issued in connection with U.S. Appl. No. 12/060,013 dated Aug. 23, 2010.
Notice of Allowance issued in connection with U.S. Appl. No. 12/060,013 dated Aug. 13, 2013.
Notice of Allowance issued in connection with U.S. Appl. No. 14/066,516 dated Aug. 25, 2014.
Office Action issued in connection with U.S. Appl. No. 14/548,221 dated Jun. 16, 2015.
Final Office Action issued in connection with U.S. Appl. No. 14/548,221 dated Nov. 23, 2015.
Notice of Allowance issued in connection with U.S. Appl. No. 14/548,221 dated Sep. 8, 2016.
Office Action issued in connection with U.S. Appl. No. 15/402,131 dated Sep. 20, 2017.
Final Office Action issued in connection with U.S. Appl. No. 15/402,131 dated Apr. 13, 2018.
Final Office Action issued in connection with U.S. Appl. No. 15/402,131 dated Sep. 17, 2018.
Office Action issued in connection with U.S. Appl. No. 12/060,015 dated Nov. 3, 2010.
Final Office Action issued in connection with U.S. Appl. No. 12/060,015 dated Mar. 31, 2011.
Office Action issued in connection with U.S. Appl. No. 12/060,015 dated Apr. 11, 2013.
Notice of Allowance issued in connection with U.S. Appl. No. 12/060,015 dated Aug. 9, 2013.
Office Action issued in connection with U.S. Appl. No. 14/078,274 dated May 5, 2015.
Notice of Allowance issued in connection with U.S. Appl. No. 14/078,274 dated Aug. 21, 2015.
Office Action issued in connection with U.S. Appl. No. 14/886,937 dated Sep. 29, 2016.
Final Office Action issued in connection with U.S. Appl. No. 14/886,937 dated Feb. 9, 2017.
Office Action issued in connection with U.S. Appl. No. 14/886,937 dated May 26, 2017.
Final Office Action issued in connection with U.S. Appl. No. 14/886,937 dated Sep. 15, 2017.
Office Action issued in connection with U.S. Appl. No. 14/886,937 dated Jan. 8, 2018.
Final Office Action issued in connection with U.S. Appl. No. 14/886,937 dated Jun. 20, 2018.
Office Action issued in connection with U.S. Appl. No. 12/060,143 dated Jun. 24, 2010.
Final Office Action issued in connection with U.S. Appl. No. 12/060,143 dated Feb. 4, 2011.
Office Action issued in connection with U.S. Appl. No. 12/060,143 dated Jul. 20, 2012.
Notice of Allowance issued in connection with U.S. Appl. No. 12/060,143 dated Jan. 25, 2013.
Office Action issued in connection with U.S. Appl. No. 14/693,819 dated Oct. 27, 2015.
Final Office Action issued in connection with U.S. Appl. No. 14/693,819 dated Feb. 16, 2016.
Office Action issued in connection with U.S. Appl. No. 14/693,819 dated Jun. 17, 2016.
Final Office Action issued in connection with U.S. Appl. No. 14/693,819 dated Nov. 4, 2016.
Office Action issued in connection with U.S. Appl. No. 14/693,819 dated May 11, 2017.
Office Action issued in connection with U.S. Appl. No. 15/891,176 dated Jun. 15, 2018.
Office Action issued in connection with U.S. Appl. No. 13/897,027 dated Aug. 20, 2014.
Notice of Allowance issued in connection with U.S. Appl. No. 13/897,027 dated Jan. 22, 2015.
Office Action issued in connection with U.S. Appl. No. 12/060,124 dated Jul. 12, 2010.
Notice of Allowance issued in connection with U.S. Appl. No. 12/060,124 dated Feb. 23, 2011.
Notice of Allowance issued in connection with U.S. Appl. No. 13/296,189 dated May 11, 2012.
Notice of Allowance issued in connection with U.S. Appl. No. 13/614,714 dated Jan. 10, 2013.
Office Action issued in connection with U.S. Appl. No. 13/888,283 dated Mar. 18, 2014.

(56) References Cited

OTHER PUBLICATIONS

Office Action issued in connection with U.S. Appl. No. 13/888,283 dated Sep. 15, 2014.
Notice of Allowance issued in connection with U.S. Appl. No. 13/888,283 dated Dec. 17, 2014.
Office Action issued in connection with U.S. Appl. No. 14/639,933 dated Aug. 17, 2015.
Notice of Allowance issued in connection with U.S. Appl. No. 14/639,933 dated Jan. 14, 2016.
Office Action issued in connection with U.S. Appl. No. 15/139,239 dated Aug. 25, 2016.
Office Action issued in connection with U.S. Appl. No. 15/483,659 dated Aug. 31, 2017.
Office Action issued in connection with U.S. Appl. No. 15/891,995 dated May 9, 2018.
Office Action issued in connection with U.S. Appl. No. 12/060,173 dated Jul. 8, 2010.
Notice of Allowance issued in connection with U.S. Appl. No. 12/060,173 dated Feb. 1, 2011.
Notice of Allowance issued in connection with U.S. Appl. No. 13/098,366 dated Nov. 7, 2011.
Notice of Allowance issued in connection with U.S. Appl. No. 13/418,239 dated Oct. 16, 2012.
Notice of Allowance issued in connection with U.S. Appl. No. 13/766,574 dated Dec. 23, 2013.
Office Action issued in connection with U.S. Appl. No. 14/263,824 dated Jul. 15, 2016.
Office Action issued in connection with U.S. Appl. No. 15/408,362 dated May 8, 2017.
Office Action issued in connection with U.S. Appl. No. 15/888,860 dated May 9, 2018.
Office Action issued in connection with U.S. Appl. No. 12/060,202 dated May 13, 2010.
Final Office Action issued in connection with U.S. Appl. No. 12/060,202 dated Nov. 9, 2010.
Office Action issued in connection with U.S. Appl. No. 12/060,202 dated Jan. 19, 2012.
Final Office Action issued in connection with U.S. Appl. No. 12/060,202 dated Jun. 28, 2012.
Notice of Allowance issued in connection with U.S. Appl. No. 12/060,202 dated Jun. 7, 2013.
Office Action issued in connection with U.S. Appl. No. 14/012,387 dated Jan. 5, 2015.
Final Office Action issued in connection with U.S. Appl. No. 14/012,387 dated Jun. 8, 2015.
Notice of Allowance issued in connection with U.S. Appl. No. 14/012,387 dated Aug. 14, 2015.
Office Action issued in connection with U.S. Appl. No. 14/961,343 dated Jul. 28, 2016.
Final Office Action issued in connection with U.S. Appl. No. 14/961,343 dated Jan. 19, 2017.
Office Action issued in connection with U.S. Appl. No. 14/961,343 dated Jun. 21, 2017.
Office Action issued in connection with U.S. Appl. No. 12/060,213 dated Jun. 17, 2010.
Final Office Action issued in connection with U.S. Appl. No. 12/060,213 dated Nov. 10, 2010.
Office Action issued in connection with U.S. Appl. No. 12/060,213 dated Mar. 22, 2012.
Notice of Allowance issued in connection with U.S. Appl. No. 13/720,955 dated Sep. 10, 2013.
Notice of Allowance issued in connection with U.S. Appl. No. 13/793,886 dated Feb. 19, 2014.
Office Action issued in connection with U.S. Appl. No. 13/621,084 dated May 30, 2014.
Final Office Action issued in connection with U.S. Appl. No. 13/621,084 dated Oct. 23, 2014.
Office Action issued in connection with U.S. Appl. No. 13/621,084 dated Feb. 11, 2015.
Final Office Action issued in connection with U.S. Appl. No. 13/621,084 dated Jun. 16, 2015.
Office Action issued in connection with U.S. Appl. No. 13/621,084 dated Nov. 6, 2015.
Final Office Action issued in connection with U.S. Appl. No. 13/621,084 dated Mar. 4, 2016.
Office Action issued in connection with U.S. Appl. No. 13/621,084 dated Sep. 21, 2016.
Final Office Action issued in connection with U.S. Appl. No. 13/621,084 dated Feb. 15, 2017.
Office Action issued in connection with U.S. Appl. No. 13/621,084 dated Jun. 22, 2017.
Final Office Action issued in connection with U.S. Appl. No. 13/621,084 dated Oct. 27, 2017.
Office Action issued in connection with U.S. Appl. No. 13/621,084 dated Apr. 4, 2018.
Final Office Action issued in connection with U.S. Appl. No. 13/621,084 dated Sep. 11, 2018.
Office Action issued in connection with U.S. Appl. No. 13/621,085 dated May 15, 2014.
Final Office Action issued in connection with U.S. Appl. No. 13/621,085 dated Oct. 23, 2014.
Office Action issued in connection with U.S. Appl. No. 13/621,085 dated Mar. 26, 2015.
Final Office Action issued in connection with U.S. Appl. No. 13/621,085 dated Jul. 10, 2015.
Office Action issued in connection with U.S. Appl. No. 13/621,085 dated Dec. 4, 2015.
Final Office Action issued in connection with U.S. Appl. No. 13/621,085 dated Apr. 4, 2016.
Office Action issued in connection with U.S. Appl. No. 13/621,085 dated Sep. 30, 2016.
Final Office Action issued in connection with U.S. Appl. No. 13/621,085 dated Feb. 28, 2017.
Office Action issued in connection with U.S. Appl. No. 13/621,085 dated Jul. 13, 2017.
Final Office Action issued in connection with U.S. Appl. No. 13/621,085 dated Jan. 19, 2018.
Office Action issued in connection with U.S. Appl. No. 13/621,085 dated Aug. 9, 2018.
Office Action issued in connection with U.S. Appl. No. 12/189,019 dated Feb. 8, 2011.
Final Office Action issued in connection with U.S. Appl. No. 12/189,019 dated Aug. 19, 2011.
Notice of Allowance issued in connection with U.S. Appl. No. 12/189,019 dated Nov. 5, 2012.
Office Action issued in connection with U.S. Appl. No. 12/956,823 dated Aug. 5, 2011.
Final Office Action issued in connection with U.S. Appl. No. 12/956,823 dated Jan. 6, 2012.
Office Action issued in connection with U.S. Appl. No. 12/956,647 dated Aug. 5, 2011.
Office Action issued in connection with U.S. Appl. No. 12/956,647 dated Jan. 13, 2012.
Notice of Allowance issued in connection with U.S. Appl. No. 12/956,647 dated Nov. 9, 2012.
Office Action issued in connection with U.S. Appl. No. 12/956,748 dated Jun. 23, 2011.
Final Office Action issued in connection with U.S. Appl. No. 12/956,748 dated Nov. 10, 2011.
Notice of Allowance issued in connection with U.S. Appl. No. 12/956,748 dated Nov. 6, 2012.
Office Action issued in connection with U.S. Appl. No. 12/596,566 dated Jul. 8, 2011.
Final Office Action issued in connection with U.S. Appl. No. 12/596,566 dated Jan. 5, 2012.
Office Action issued in connection with U.S. Appl. No. 12/165,343 dated Mar. 22, 2010.
Office Action issued in connection with U.S. Appl. No. 13/568,005 dated Nov. 5, 2012.
Office Action issued in connection with U.S. Appl. No. 13/896,840 dated Sep. 23, 2014.

(56) References Cited

OTHER PUBLICATIONS

Notice of Allowance issued in connection with U.S. Appl. No. 13/896,840 dated Jan. 5, 2015.
Office Action issued in connection with U.S. Appl. No. 14/683,019 dated Aug. 11, 2015.
Final Office Action issued in connection with U.S. Appl. No. 14/683,019 dated Dec. 4, 2015.
Office Action issued in connection with U.S. Appl. No. 14/683,019 dated May 9, 2016.
Final Office Action issued in connection with U.S. Appl. No. 14/683,019 dated Sep. 15, 2016.
Office Action issued in connection with U.S. Appl. No. 13/042,301 dated Aug. 24, 2011.
Office Action issued in connection with U.S. Appl. No. 12/412,456 dated May 16, 2011.
Final Office Action issued in connection with U.S. Appl. No. 12/412,456 dated Mar. 12, 2012.
Notice of Allowance issued in connection with U.S. Appl. No. 12/412,456 dated Feb. 12, 2014.
Office Action issued in connection with U.S. Appl. No. 13/909,882 dated Aug. 21, 2014.
Final Office Action issued in connection with U.S. Appl. No. 13/909,882 dated Jan. 14, 2015.
Notice of Allowance issued in connection with U.S. Appl. No. 13/909,882 dated Mar. 24, 2015.
Office Action issued in connection with U.S. Appl. No. 14/010,438 dated Sep. 11, 2014.
Notice of Allowance issued in connection with U.S. Appl. No. 14/010,438 dated Dec. 11, 2014.
Office Action issued in connection with U.S. Appl. No. 14/297,558 dated Sep. 30, 2014.
Final Office Action issued in connection with U.S. Appl. No. 14/297,558 dated Apr. 7, 2015.
Notice of Allowance issued in connection with U.S. Appl. No. 14/297,558 dated Jul. 21, 2015.
Office Action issued in connection with U.S. Appl. No. 14/630,516 dated Nov. 3, 2016.
Office Action issued in connection with U.S. Appl. No. 14/630,516 dated May 8, 2017.
Final Office Action issued in connection with U.S. Appl. No. 14/630,516 dated Nov. 9, 2017.
Office Action issued in connection with U.S. Appl. No. 14/630,516 dated Apr. 5, 2018.
Office Action issued in connection with U.S. Appl. No. 14/718,037 dated Oct. 26, 2016.
Office Action issued in connection with U.S. Appl. No. 14/718,037 dated May 5, 2017.
Final Office Action issued in connection with U.S. Appl. No. 14/718,037 dated Nov. 9, 2017.
Office Action issued in connection with U.S. Appl. No. 14/718,037 dated Mar. 28, 2018.
Office Action issued in connection with U.S. Appl. No. 14/935,228 dated Mar. 8, 2018.
Final Office Action issued in connection with U.S. Appl. No. 14/935,228 dated Sep. 12, 2018.
Office Action issued in connection with U.S. Appl. No. 13/621,062 dated Dec. 5, 2012.
Notice of Allowance issued in connection with U.S. Appl. No. 13/621,062 dated Feb. 22, 2013.
Office Action issued in connection with U.S. Appl. No. 13/621,066 dated Feb. 14, 2013.
Notice of Allowance issued in connection with U.S. Appl. No. 13/621,066 dated May 8, 2013.
Office Action issued in connection with U.S. Appl. No. 12/412,467 dated May 22, 2013.
Notice of Allowance issued in connection with U.S. Appl. No. 12/412,467 dated Nov. 8, 2013.
Office Action issued in connection with U.S. Appl. No. 12/485,783 dated Aug. 30, 2012.
Office Action issued in connection with U.S. Appl. No. 12/485,783 dated Mar. 26, 2013.
Final Office Action issued in connection with U.S. Appl. No. 12/485,783 dated Oct. 7, 2013.
Notice of Allowance issued in connection with U.S. Appl. No. 12/485,783 dated Mar. 31, 2014.
Office Action issued in connection with U.S. Appl. No. 14/331,067 dated Nov. 26, 2014.
Final Office Action issued in connection with U.S. Appl. No. 14/331,067 dated Apr. 27, 2015.
Notice of Allowance issued in connection with U.S. Appl. No. 14/331,067 dated Jul. 7, 2015.
Final Office Action issued in connection with U.S. Appl. No. 14/871,872 dated Oct. 17, 2016.
Office Action issued in connection with U.S. Appl. No. 14/871,872 dated Feb. 10, 2017.
Office Action issued in connection with U.S. Appl. No. 14/871,872 dated Feb. 7, 2018.
Office Action issued in connection with U.S. Appl. No. 13/620,868 dated Nov. 23, 2012.
Office Action issued in connection with U.S. Appl. No. 12/412,431 dated Mar. 8, 2012.
Office Action issued in connection with U.S. Appl. No. 12,412,431 dated Nov. 23, 2012.
Notice of Allowance issued in connection with U.S. Appl. No. 12,412,431 dated May 10, 2013.
Office Action issued in connection with U.S. Appl. No. 13/973,883 dated Oct. 23, 2015.
Final Office Action issued in connection with U.S. Appl. No. 13/973,883 dated May 5, 2016.
Office Action issued in connection with U.S. Appl. No. 13/973,883 dated Sep. 30, 2016.
Final Office Action issued in connection with U.S. Appl. No. 13/973,883 dated Apr. 18, 2017.
Office Action issued in connection with U.S. Appl. No. 12/272,681 dated Nov. 26, 2010.
Final Office Action issued in connection with U.S. Appl. No. 12/272,681 dated Apr. 27, 2011.
Office Action issued in connection with U.S. Appl. No. 12/272,681 dated Oct. 11, 2012.
Notice of Allowance issued in connection with U.S. Appl. No. 12/272,681 dated Apr. 18, 2013.
Office Action issued in connection with U.S. Appl. No. 14/010,461 dated May 2, 2014.
Final Office Action issued in connection with U.S. Appl. No. 14/010,461 dated Oct. 9, 2014.
Office Action issued in connection with U.S. Appl. No. 14/010,461 dated Jan. 15, 2015.
Final Office Action issued in connection with U.S. Appl. No. 14/010,461 dated Jul. 9, 2015.
Office Action issued in connection with U.S. Appl. No. 15/003,699 dated Jul. 8, 2016.
Office Action issued in connection with U.S. Appl. No. 12/272,666 dated Feb. 23, 2011.
Notice of Allowance issued in connection with U.S. Appl. No. 12/272,666 dated Aug. 25, 2011.
Notice of Allowance issued in connection with U.S. Appl. No. 13/296,156 dated Jun. 8, 2012.
Notice of Allowance issued in connection with U.S. Appl. No. 13/620,945 dated May 1, 2013.
Office Action issued in connection with U.S. Appl. No. 12/412,443 dated Mar. 15, 2012.
Notice of Allowance issued in connection with U.S. Appl. No. 12/412,443 dated Nov. 27, 2012.
Office Action issued in connection with U.S. Appl. No. 13/829,586 dated May 28, 2015.
Office Action issued in connection with U.S. Appl. No. 14/942,728 dated Feb. 28, 2017.
Final Office Action issued in connection with U.S. Appl. No. 14/942,728 dated Aug. 15, 2017.
Office Action issued in connection with U.S. Appl. No. 14/942,728 dated Dec. 29, 2017.

(56) References Cited

OTHER PUBLICATIONS

Final Office Action issued in connection with U.S. Appl. No. 14/942,728 dated Jul. 27, 2018.
Office Action issued in connection with U.S. Appl. No. 12/272,687 dated Sep. 9, 2010.
Office Action issued in connection with U.S. Appl. No. 12/272,687 dated Feb. 3, 2011.
Notice of Allowance issued in connection with U.S. Appl. No. 12/272,687 dated May 27, 2011.
Notice of Allowance issued in connection with U.S. Appl. No. 12/272,687 dated Aug. 17, 2012.
Office Action issued in connection with U.S. Appl. No. 13/908,830 dated Sep. 23, 2014.
Notice of Allowance issued in connection with U.S. Appl. No. 13/908,830 dated Dec. 15, 2014.
Office Action issued in connection with U.S. Appl. No. 14/631,556 dated Aug. 23, 2016.
Final Office Action issued in connection with U.S. Appl. No. 14/631,556 dated Jan. 26, 2017.
Office Action issued in connection with U.S. Appl. No. 14/631,556 dated May 26, 2017.
Final Office Action issued in connection with U.S. Appl. No. 14/631,556 dated Dec. 21, 2017.
Office Action issued in connection with U.S. Appl. No. 12/272,655 dated Mar. 4, 2011.
Final Office Action issued in connection with U.S. Appl. No. 12/272,655 dated Oct. 28, 2011.
Notice of Allowance issued in connection with U.S. Appl. No. 12/272,655 dated Jan. 16, 2014.
Office Action issued in connection with U.S. Appl. No. 14/281,165 dated Aug. 5, 2015.
Final Office Action issued in connection with U.S. Appl. No. 14/281,165 dated Feb. 16, 2016.
Office Action issued in connection with U.S. Appl. No. 14/281,165 dated Jun. 23, 2016.
Final Office Action issued in connection with U.S. Appl. No. 14/281,165 dated Dec. 30, 2016.
Office Action issued in connection with U.S. Appl. No. 12/272,699 dated Dec. 14, 2010.
Office Action issued in connection with U.S. Appl. No. 13/299,169 dated Feb. 3, 2012.
Notice of Allowance issued in connection with U.S. Appl. No. 13/299,169 dated Mar. 27, 2012.
Office Action issued in connection with U.S. Appl. No. 13/567,429 dated Nov. 16, 2012.
Notice of Allowance issued in connection with U.S. Appl. No. 13/567,429 dated Jul. 25, 2013.
Office Action issued in connection with U.S. Appl. No. 14/062,614 dated Jul. 6, 2015.
Final Office Action issued in connection with U.S. Appl. No. 14/062,614 dated Jan. 6, 2016.
Office Action issued in connection with U.S. Appl. No. 15/369,758 dated Feb. 28, 2017.
Office Action issued in connection with U.S. Appl. No. 15/682,383 dated Mar. 9, 2018.
Office Action issued in connection with U.S. Appl. No. 12/272,683 dated Sep. 9, 2010.
Final Office Action issued in connection with U.S. Appl. No. 12/272,683 dated Jan. 14, 2011.
Notice of Allowance issued in connection with U.S. Appl. No. 13/165,484 dated Mar. 22, 2012.
Notice of Allowance issued in connection with U.S. Appl. No. 13/529,831 dated Dec. 13, 2012.
Office Action issued in connection with U.S. Appl. No. 13/829,518 dated Sep. 19, 2014.
Notice of Allowance issued in connection with U.S. Appl. No. 13/829,518 dated Jan. 15, 2015.
Office Action issued in connection with U.S. Appl. No. 14/673,743 dated Aug. 23, 2016.
Final Office Action issued in connection with U.S. Appl. No. 14/673,743 dated Jan. 5, 2017.
Office Action issued in connection with U.S. Appl. No. 14/673,743 dated May 5, 2017.
Final Office Action issued in connection with U.S. Appl. No. 14/673,743 dated Nov. 9, 2017.
Office Action issued in connection with U.S. Appl. No. 12/272,715 dated Jan. 24, 2011.
Final Office Action issued in connection with U.S. Appl. No. 12/272,715 dated Jun. 28, 2011.
Notice of Allowance issued in connection with U.S. Appl. No. 12/272,715 dated Oct. 21, 2011.
Office Action issued in connection with U.S. Appl. No. 13/358,478 dated Apr. 26, 2012.
Final Office Action issued in connection with U.S. Appl. No. 13/358,478 dated Oct. 12, 2012.
Notice of Allowance issued in connection with U.S. Appl. No. 13/358,478 dated Apr. 2, 2014.
Office Action issued in connection with U.S. Appl. No. 14/337,021 dated Jun. 30, 2016.
Final Office Action issued in connection with U.S. Appl. No. 14/337,021 dated Jan. 6, 2017.
Office Action issued in connection with U.S. Appl. No. 12/272,641 dated Feb. 23, 2011.
Notice of Allowance issued in connection with U.S. Appl. No. 12/272,641 dated Aug. 25, 2011.
Notice of Allowance issued in connection with U.S. Appl. No. 13/299,229 dated Jun. 6, 2012.
Notice of Allowance issued in connection with U.S. Appl. No. 13/614,971 dated May 31, 2013.
Office Action issued in connection with U.S. Appl. No. 12/722,454 dated May 31, 2012.
Notice of Allowance issued in connection with U.S. Appl. No. 12/722,454 dated Nov. 26, 2012.
Notice of Allowance issued in connection with U.S. Appl. No. 13/794,415 dated Apr. 14, 2015.
Office Action issued in connection with U.S. Appl. No. 14/800,591 dated Oct. 6, 2016.
Office Action issued in connection with U.S. Appl. No. 12/892,777 dated Mar. 22, 2013.
Final Office Action issued in connection with U.S. Appl. No. 12/892,777 dated Jan. 30, 2014.
Office Action issued in connection with U.S. Appl. No. 12/892,777 dated Mar. 25, 2015.
Final Office Action issued in connection with U.S. Appl. No. 12/892,777 dated Oct. 5, 2015.
Office Action issued in connection with U.S. Appl. No. 12/892,777 dated Apr. 6, 2016.
Final Office Action issued in connection with U.S. Appl. No. 12/892,777 dated Oct. 4, 2016.
Office Action issued in connection with U.S. Appl. No. 15/604,451 dated Oct. 5, 2017.
Final Office Action issued in connection with U.S. Appl. No. 15/604,451 dated May 17, 2018.
Office Action issued in connection with U.S. Appl. No. 12/892,794 dated Jul. 23, 2012.
Final Office Action issued in connection with U.S. Appl. No. 12/892,764 dated Feb. 15, 2013.
Office Action issued in connection with U.S. Appl. No. 12/892,794 dated Jul. 24, 2014.
Final Office Action issued in connection with U.S. Appl. No. 12/892,794 dated Feb. 13, 2015.
Office Action issued in connection with U.S. Appl. No. 12/892,794 dated Sep. 18, 2015.
Final Office Action issued in connection with U.S. Appl. No. 12/892,794 dated Mar. 24, 2016.
Office Action issued in connection with U.S. Appl. No. 12/892,794 dated Jan. 12, 2017.
Final Office Action issued in connection with U.S. Appl. No. 12/892,794 dated May 5, 2017.
Office Action issued in connection with U.S. Appl. No. 12/892,794 dated Oct. 5, 2017.

(56) References Cited

OTHER PUBLICATIONS

Final Office Action issued in connection with U.S. Appl. No. 12/892,794 dated May 18, 2018.
Office Action issued in connection with U.S. Appl. No. 12/892,822 dated Oct. 11, 2012.
Notice of Allowance issued in connection with U.S. Appl. No. 12/892,822 dated Mar. 4, 2013.
Office Action issued in connection with U.S. Appl. No. 13/919,912 dated Feb. 20, 2015.
Final Office Action issued in connection with U.S. Appl. No. 13/919,912 dated Jul. 22, 2015.
Office Action issued in connection with U.S. Appl. No. 13/919,912 dated Jan. 13, 2017.
Final Office Action issued in connection with U.S. Appl. No. 13/919,912 dated May 8, 2017.
Office Action issued in connection with U.S. Appl. No. 13/919,912 dated Aug. 30, 2017.
Final Office Action issued in connection with U.S. Appl. No. 13/919,912 dated Feb. 2, 2018.
Office Action issued in connection with U.S. Appl. No. 13/919,912 dated Jun. 1, 2018.
Office Action issued in connection with U.S. Appl. No. 13/620,976 dated Jan. 10, 2013.
Final Office Action issued in connection with U.S. Appl. No. 13/620,976 dated Aug. 13, 2013.
Office Action issued in connection with U.S. Appl. No. 12/892,818 dated Oct. 22, 2012.
Final Office Action issued in connection with U.S. Appl. No. 12/892,818 dated Feb. 13, 2013.
Office Action issued in connection with U.S. Appl. No. 12/892,818 dated Apr. 11, 2014.
Final Office Action issued in connection with U.S. Appl. No. 12/892,818 dated Oct. 10, 2014.
Notice of Allowance issued in connection with U.S. Appl. No. 12/892,818 dated Dec. 19, 2014.
Office Action issued in connection with U.S. Appl. No. 14/629,411 dated Sep. 1, 2015.
Final Office Action issued in connection with U.S. Appl. No. 14/629,411 dated Dec. 23, 2015.
Office Action issued in connection with U.S. Appl. No. 14/629,411 dated May 2, 2016.
Final Office Action issued in connection with U.S. Appl. No. 14/629,411 dated Sep. 26, 2016.
Office Action issued in connection with U.S. Appl. No. 14/629,411 dated Jan. 18, 2017.
Final Office Action issued in connection with U.S. Appl. No. 14/629,411 dated May 9, 2017.
Office Action issued in connection with U.S. Appl. No. 14/629,411 dated Sep. 8, 2017.
Office Action issued in connection with U.S. Appl. No. 13/621,010 dated Jan. 10, 2013.
Final Office Action issued in connection with U.S. Appl. No. 13/621,010 dated May 21, 2013.
Office Action issued in connection with U.S. Appl. No. 13/621,010 dated Apr. 8, 2014.
Final Office Action issued in connection with U.S. Appl. No. 13/621,010 dated Oct. 10, 2014.
Office Action issued in connection with U.S. Appl. No. 13/621,010 dated Feb. 5, 2015.
Final Office Action issued in connection with U.S. Appl. No. 13/621,010 dated Jul. 10, 2015.
Office Action issued in connection with U.S. Appl. No. 13/621,010 dated Feb. 8, 2016.
Final Office Action issued in connection with U.S. Appl. No. 13/621,010 dated Jun. 2, 2016.
Office Action issued in connection with U.S. Appl. No. 12/892,819 dated Oct. 11, 2012.
Final Office Action issued in connection with U.S. Appl. No. 12/892,819 dated Feb. 15, 2013.
Office Action issued in connection with U.S. Appl. No. 12/892,819 dated Apr. 15, 2014.
Final Office Action issued in connection with U.S. Appl. No. 12/892,819 dated Oct. 28, 2014.
Office Action issued in connection with U.S. Appl. No. 12/892,819 dated Feb. 18, 2015.
Final Office Action issued in connection with U.S. Appl. No. 12/892,819 dated Jul. 24, 2015.
Office Action issued in connection with U.S. Appl. No. 12/892,819 dated Mar. 18, 2016.
Final Office Action issued in connection with U.S. Appl. No. 12/892,819 dated Aug. 2, 2016.
Office Action issued in connection with U.S. Appl. No. 12/892,819 dated Dec. 22, 2016.
Final Office Action issued in connection with U.S. Appl. No. 12/892,819 dated Apr. 11, 2017.
Office Action issued in connection with U.S. Appl. No. 12/892,819 dated Aug. 10, 2017.
Office Action issued in connection with U.S. Appl. No. 13/620,979 dated Jan. 16, 2013.
Final Office Action issued in connection with U.S. Appl. No. 13/620,979 dated May 28, 2013.
Office Action issued in connection with U.S. Appl. No. 13/620,979 dated Feb. 11, 2014.
Final Office Action issued in connection with U.S. Appl. No. 13/620,979 dated Jul. 15, 2014.
Office Action issued in connection with U.S. Appl. No. 13/620,979 dated Nov. 13, 2014.
Final Office Action issued in connection with U.S. Appl. No. 13/620,979 dated Feb. 23, 2015.
Office Action issued in connection with U.S. Appl. No. 13/620,979 dated Dec. 23, 2015.
Final Office Action issued in connection with U.S. Appl. No. 13/620,979 dated Apr. 8, 2016.
Office Action issued in connection with U.S. Appl. No. 13/620,979 dated Jul. 28, 2016.
Final Office Action issued in connection with U.S. Appl. No. 13/620,979 dated Dec. 7, 2016.
Office Action issued in connection with U.S. Appl. No. 13/620,979 dated Mar. 20, 2017.
Office Action issued in connection with U.S. Appl. No. 12/892,852 dated Oct. 11, 2012.
Office Action issued in connection with U.S. Appl. No. 12/892,852 dated Feb. 24, 2014.
Final Office Action issued in connection with U.S. Appl. No. 12/892,852 dated Aug. 8, 2014.
Office Action issued in connection with U.S. Appl. No. 12/892,852 dated Dec. 1, 2014.
Final Office Action issued in connection with U.S. Appl. No. 12/892,852 dated Mar. 20, 2015.
Office Action issued in connection with U.S. Appl. No. 12/892,852 dated Dec. 23, 2015.
Office Action issued in connection with U.S. Appl. No. 13/621,022 dated Jan. 2, 2013.
Final Office Action issued in connection with U.S. Appl. No. 13/621,022 dated May 22, 2013.
Office Action issued in connection with U.S. Appl. No. 13/621,022 dated Feb. 12, 2014.
Final Office Action issued in connection with U.S. Appl. No. 13/621,022 dated Jul. 17, 2014.
Office Action issued in connection with U.S. Appl. No. 13/621,022 dated Nov. 14, 2014.
Final Office Action issued in connection with U.S. Appl. No. 13/621,022 dated Feb. 23, 2015.
Office Action issued in connection with U.S. Appl. No. 13/621,022 dated Dec. 15, 2015.
Final Office Action issued in connection with U.S. Appl. No. 13/621,022 dated Apr. 5, 2016.
Office Action issued in connection with U.S. Appl. No. 13/621,022 dated Aug. 25, 2016.
Final Office Action issued in connection with U.S. Appl. No. 13/621,022 dated Dec. 22, 2016.

(56) References Cited

OTHER PUBLICATIONS

Office Action issued in connection with U.S. Appl. No. 13/621,022 dated Mar. 24, 2017.
Final Office Action issued in connection with U.S. Appl. No. 13/621,022 dated Jul. 26, 2017.
Office Action issued in connection with U.S. Appl. No. 13/621,022 dated Dec. 18, 2017.
Office Action issued in connection with U.S. Appl. No. 15/191,240 dated Nov. 2, 2016.
Final Office Action issued in connection with U.S. Appl. No. 15/191,240 dated Apr. 3, 2017.
Office Action issued in connection with U.S. Appl. No. 15/191,240 dated Jul. 18, 2017.
Office Action issued in connection with U.S. Appl. No. 12/892,873 dated Aug. 21, 2012.
Final Office Action issued in connection with U.S. Appl. No. 12/892,873 dated Jan. 7, 2013.
Office Action issued in connection with U.S. Appl. No. 12/892,873 dated May 7, 2014.
Notice of Allowance issued in connection with U.S. Appl. No. 12/892,873 dated Sep. 12, 2014.
Office Action issued in connection with U.S. Appl. No. 14/550,889 dated Mar. 12, 2015.
Notice of Allowance issued in connection with U.S. Appl. No. 14/550,889 dated Jul. 17, 2015.
Office Action issued in connection with U.S. Appl. No. 12/892,861 dated Aug. 21, 2012.
Final Office Action issued in connection with U.S. Appl. No. 12/892,861 dated Jan. 4, 2013.
Office Action issued in connection with U.S. Appl. No. 12/892,681 dated May 7, 2014.
Notice of Allowance issued in connection with U.S. Appl. No. 12/892,681 dated Aug. 29, 2014.
Office Action issued in connection with U.S. Appl. No. 14/550,892 dated Apr. 27, 2015.
Final Office Action issued in connection with U.S. Appl. No. 14/550,892 dated Aug. 17, 2015.
Notice of Allowance issued in connection with U.S. Appl. No. 14/550,892 dated Oct. 15, 2015.
Office Action issued in connection with U.S. Appl. No. 12/892,889 dated May 1, 2013.
Final Office Action issued in connection with U.S. Appl. No. 12/892,889 dated Oct. 10, 2012.
Notice of Allowance issued in connection with U.S. Appl. No. 12/892,889 dated Oct. 3, 2014.
Notice of Allowance issued in connection with U.S. Appl. No. 14/566,615 dated Jun. 19, 2015.
Office Action issued in connection with U.S. Appl. No. 12/892,880 dated Sep. 20, 2012.
Final Office Action issued in connection with U.S. Appl. No. 12/892,880 dated Apr. 5, 2013.
Office Action issued in connection with U.S. Appl. No. 14/071,276 dated Aug. 25, 2014.
Final Office Action issued in connection with U.S. Appl. No. 14/071,276 dated Feb. 4, 2015.
Notice of Allowance issued in connection with U.S. Appl. No. 14/071,276 dated Apr. 2, 2015.
Office Action issued in connection with U.S. Appl. No. 14/807,726 dated Jan. 9, 2017.
Final Office Action issued in connection with U.S. Appl. No. 14/807,726 dated Apr. 24, 2017.
Office Action issued in connection with U.S. Appl. No. 12/892,877 dated Nov. 6, 2012.
Final Office Action issued in connection with U.S. Appl. No. 12/892,877 dated Mar. 19, 2013.
Notice of Allowance issued in connection with U.S. Appl. No. 12/892,877 dated Jun. 2, 2014.
Office Action issued in connection with U.S. Appl. No. 14/467,774 dated Mar. 27, 2015.
Notice of Allowance issued in connection with U.S. Appl. No. 14/467,774 dated Jul. 23, 2015.
Office Action issued in connection with U.S. Appl. No. 14/871,941 dated Feb. 2, 2016.
Final Office Action issued in connection with U.S. Appl. No. 14/871,941 dated Jul. 21, 2016.
Final Office Action issued in connection with U.S. Appl. No. 14/871,941 dated Apr. 11, 2017.
Office Action issued in connection with U.S. Appl. No. 12/695,537 dated Mar. 30, 2012.
Final Office Action issued in connection with U.S. Appl. No. 12/695,537 dated Oct. 15, 2012.
Office Action issued in connection with U.S. Appl. No. 12/695,537 dated Jul. 8, 2014.
Office Action issued in connection with U.S. Appl. No. 12/695,537 dated Jan. 29, 2015.
Final Office Action issued in connection with U.S. Appl. No. 12/695,537 dated Aug. 14, 2015.
Office Action issued in connection with U.S. Appl. No. 12/695,537 dated Jan. 8, 2016.
Notice of Allowance issued in connection with U.S. Appl. No. 12/695,537 dated Jul. 18, 2016.
Office Action issued in connection with U.S. Appl. No. 15/351,074 dated Feb. 8, 2018.
Final Office Action issued in connection with U.S. Appl. No. 15/351,074 dated Aug. 28, 2018.
Notice of Allowance issued in connection with U.S. Appl. No. 12/952,118 dated Feb. 4, 2013.
Office Action issued in connection with U.S. Appl. No. 13/873,040 dated Jul. 18, 2014.
Notice of Allowance issued in connection with U.S. Appl. No. 13/873,040 dated Dec. 1, 2014.
Office Action issued in connection with U.S. Appl. No. 14/629,433 dated Nov. 6, 2015.
Final Office Action issued in connection with U.S. Appl. No. 14/629,433 dated May 18, 2016.
Office Action issued in connection with U.S. Appl. No. 14/629,433 dated Oct. 7, 2016.
Final Office Action issued in connection with U.S. Appl. No. 14/629,433 dated May 19, 2017.
Office Action issued in connection with U.S. Appl. No. 12/960,421 dated May 10, 2013.
Office Action issued in connection with U.S. Appl. No. 12/960,402 dated Jun. 20, 2013.
Final Office Action issued in connection with U.S. Appl. No. 12/960,402 dated May 8, 2014.
Office Action issued in connection with U.S. Appl. No. 12/960,402 dated Oct. 23, 2014.
Final Office Action issued in connection with U.S. Appl. No. 12/960,402 dated May 19, 2015.
Office Action issued in connection with U.S. Appl. No. 12/960,402 dated Sep. 24, 2015.
Office Action issued in connection with U.S. Appl. No. 11/771,679 dated Apr. 30, 2010.
Final Office Action issued in connection with U.S. Appl. No. 11/771,679 dated Sep. 1, 2010.
Office Action issued in connection with U.S. Appl. No. 13/401,715 dated Jun. 26, 2013.
Final Office Action issued in connection with U.S. Appl. No. 13/401,715 dated Jan. 14, 2014.
Office Action issued in connection with U.S. Appl. No. 13/401,715 dated Jul. 18, 2014.
Final Office Action issued in connection with U.S. Appl. No. 13/401,715 dated Feb. 27, 2015.
Office Action issued in connection with U.S. Appl. No. 13/401,715 dated Jul. 8, 2015.
Office Action issued in connection with U.S. Appl. No. 13/401,715 dated Jan. 27, 2017.
Final Office Action issued in connection with U.S. Appl. No. 13/401,715 dated Oct. 3, 2017.
Office Action issued in connection with U.S. Appl. No. 14/556,647 dated Oct. 19, 2015.

(56) References Cited

OTHER PUBLICATIONS

Office Action issued in connection with U.S. Appl. No. 14/556,647 dated Mar. 18, 2016.
Final Office Action issued in connection with U.S. Appl. No. 14/556,647 dated Aug. 25, 2016.
Office Action issued in connection with U.S. Appl. No. 13/437,274 dated Jun. 6, 2014.
Final Office Action issued in connection with U.S. Appl. No. 13/437,274 dated Jan. 2, 2015.
Office Action issued in connection with U.S. Appl. No. 13/437,274 dated Jul. 29, 2015.
Final Office Action issued in connection with U.S. Appl. No. 13/437,274 dated Feb. 1, 2016.
Office Action issued in connection with U.S. Appl. No. 13/437,274 dated Oct. 7, 2016.
Final Office Action issued in connection with U.S. Appl. No. 13/437,274 dated May 11, 2017.
Office Action issued in connection with U.S. Appl. No. 13/437,274 dated Dec. 14, 2017.
Final Office Action issued in connection with U.S. Appl. No. 13/437,274 dated Jul. 11, 2018.
Office Action issued in connection with U.S. Appl. No. 13/493,839 dated Jan. 14, 2014.
Office Action issued in connection with U.S. Appl. No. 13/493,839 dated Jan. 15, 2015.
Notice of Allowance issued in connection with U.S. Appl. No. 13/493,839 dated May 8, 2015.
Office Action issued in connection with U.S. Appl. No. 14/800,540 dated May 23, 2017.
Office Action issued in connection with U.S. Appl. No. 14/800,540 dated Jan. 24, 2018.
Final Office Action issued in connection with U.S. Appl. No. 13/528,664 dated Mar. 26, 2015.
Office Action issued in connection with U.S. Appl. No. 13/603,369 dated Jan. 22, 2015.
Office Action issued in connection with U.S. Appl. No. 13/603,369 dated Jun. 11, 2015.
Final Office Action issued in connection with U.S. Appl. No. 13/603,369 dated Nov. 17, 2015.
Office Action issued in connection with U.S. Appl. No. 11/395,463 dated Nov. 13, 2009.
Final Office Action issued in connection with U.S. Appl. No. 11/395,463 dated Dec. 29, 2010.
Office Action issued in connection with U.S. Appl. No. 11/395,463 dated Jul. 19, 2011.
Office Action issued in connection with U.S. Appl. No. 14/091,272 dated Aug. 4, 2015.
Final Office Action issued in connection with U.S. Appl. No. 14/091,272 dated Jun. 9, 2017.
Office Action issued in connection with U.S. Appl. No. 13/909,705 dated Jun. 25, 2015.
Office Action issued in connection with U.S. Appl. No. 15/075,728 dated Aug. 2, 2017.
Office Action issued in connection with U.S. Appl. No. 15/935,615 dated Aug. 23, 2018.
Office Action issued in connection with U.S. Appl. No. 13/095,554 dated Sep. 4, 2012.
Final Office Action issued in connection with U.S. Appl. No. 13/095,554 dated Jun. 20, 2013.
Office Action issued in connection with U.S. Appl. No. 13/095,554 dated Oct. 7, 2014.
Final Office Action issued in connection with U.S. Appl. No. 13/095,554 dated Jun. 30, 2015.
Office Action issued in connection with U.S. Appl. No. 13/095,554 dated Nov. 12, 2015.
Final Office Action issued in connection with U.S. Appl. No. 13/095,554 dated May 19, 2016.
Office Action issued in connection with U.S. Appl. No. 13/095,554 dated May 18, 2017.
Final Office Action issued in connection with U.S. Appl. No. 13/095,554 dated Sep. 21, 2017.
Office Action issued in connection with U.S. Appl. No. 13/095,554 dated Mar. 9, 2018.
Final Office Action issued in connection with U.S. Appl. No. 13/095,554 dated Jun. 28, 2018.
Office Action issued in connection with U.S. Appl. No. 14/575,798 dated Sep. 19, 2016.
Final Office Action issued in connection with U.S. Appl. No. 14/575,798 dated May 3, 2017.
Office Action issued in connection with U.S. Appl. No. 14/575,798 dated Aug. 23, 2017.
Office Action issued in connection with U.S. Appl. No. 14/575,816 dated Sep. 22, 2016.
Final Office Action issued in connection with U.S. Appl. No. 14/575,816 dated May 3, 2017.
Office Action issued in connection with U.S. Appl. No. 14/575,816 dated Aug. 23, 2017.
Final Office Action issued in connection with U.S. Appl. No. 14/575,816 dated Mar. 22, 2018.
Office Action issued in connection with U.S. Appl. No. 14/575,834 dated Sep. 30, 2016.
Final Office Action issued in connection with U.S. Appl. No. 14/575,834 dated Apr. 18, 2017.
Office Action issued in connection with U.S. Appl. No. 14/575,834 dated Nov. 9, 2017.
Office Action issued in connection with U.S. Appl. No. 14/666,205 dated May 10, 2017.
Final Office Action issued in connection with U.S. Appl. No. 14/666,205 dated Nov. 3, 2017.
Office Action issued in connection with U.S. Appl. No. 14/666,205 dated May 9, 2018.
Final Office Action issued in connection with U.S. Appl. No. 14/673,121 dated Jun. 1, 2017.
Final Office Action issued in connection with U.S. Appl. No. 14/673,159 dated Jun. 1, 2017.
Office Action issued in connection with U.S. Appl. No. 14/711,502 dated Mar. 24, 2017.
Office Action issued in connection with U.S. Appl. No. 15/788,657 dated Mar. 28, 2018.
Office Action issued in connection with U.S. Appl. No. 12/652,541 dated Jan. 3, 2012.
Final Office Action issued in connection with U.S. Appl. No. 12/652,541 dated Sep. 5, 2012.
Notice of Allowance issued in connection with U.S. Appl. No. 12/652,541 dated Jan. 4, 2013.
Office Action issued in connection with U.S. Appl. No. 13/842,970 dated Apr. 30, 2014.
Final Office Action issued in connection with U.S. Appl. No. 13/842,970 dated Aug. 19, 2014.
Notice of Allowance issued in connection with U.S. Appl. No. 14/644,031 dated Sep. 28, 2015.
Office Action issued in connection with U.S. Appl. No. 14/815,863 dated Jul. 13, 2017.
Office Action issued in connection with U.S. Appl. No. 14/815,843 dated Mar. 20, 2018.
Office Action issued in connection with U.S. Appl. No. 14/864,684 dated Mar. 15, 2017.
Office Action issued in connection with U.S. Appl. No. 14/864,683 dated Dec. 16, 2016.
Office Action issued in connection with U.S. Appl. No. 14/975,157 dated Nov. 2, 2017.
Final Office Action issued in connection with U.S. Appl. No. 14/975,157 dated Jun. 15, 2018.
Final Office Action issued in connection with U.S. Appl. No. 14/975,341 dated Mar. 22, 2018.
Office Action issued in connection with U.S. Appl. No. 15/389,314 dated Aug. 10, 2018.
Office Action issued in connection with U.S. Appl. No. 15/391,696 dated Jun. 20, 2018.
Office Action in Application No. 09729072.0 dated May 14, 2018.
Examination Report in Indian Application No. 6213/CHENP/2010 dated May 23, 2018.

(56) References Cited

OTHER PUBLICATIONS

International Preliminary Report on Patentability in PCT/US/2016/066848 dated Jun. 19, 2018.

\* cited by examiner

MANAGING NETWORK COMPUTING COMPONENTS UTILIZING REQUEST ROUTING

CROSS REFERENCE TO RELATED APPLICATIONS

This application is a continuation of U.S. patent application Ser. No. 15/075,728, now U.S. Pat. No. 9,929,959, entitled "MANAGING NETWORK COMPUTING COMPONENTS UTILIZING REQUEST ROUTING" and filed on Mar. 21, 2016, which in turn is a continuation of U.S. application Ser. No. 13/909,705, now U.S. Pat. No. 9,294,391, entitled "MANAGING NETWORK COMPUTING COMPONENTS UTILIZING REQUEST ROUTING" and filed on Jun. 4, 2013, the disclosures of which are incorporated herein by reference.

BACKGROUND

Generally described, computing devices and communication networks can be utilized to exchange information. In a common application, a computing device can request content from another computing device via a communication network. For example, a user at a personal computing device can utilize various types of software applications to request information from server computing devices via the Internet. In such embodiments, the user computing device can be referred to as a client computing device and the server computing device can be referred to as a service provider.

In some embodiments, companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

In some embodiments, a client computing device may access software applications that may be provided by communication with a data center. For example, a service provider may host, or have hosted on its behalf, one or more physical computing devices in a data center that provide client computing devices with access to software application via a communication network. Additionally, the service provider can also utilize virtualization technologies to provide access to the software application. For example, the service provider can instantiate and maintain a number of virtual machine instances on the physical computing devices associated with a data center.

Service providers are generally motivated to provide requested content/services or access to requested content/services to client computing devices often with consideration of cost and customer experience. For example, service providers can associate a cost associated with providing the client computing device with access to content/service and manage instantiated virtual machine instances on the basis of cost or available resources.

DETAILED DESCRIPTION

Generally described, the present disclosure is directed to processing DNS queries from client computing devices. Specifically, aspects of the disclosure will be described with regard to the processing of a client computing device DNS queries by a DNS processing service in which the DNS query includes an identifier associated with a previously instantiated hosted virtual machine instance. In one aspect, if the previously instantiated hosted virtual machine instance is instantiated and available to process requests, the DNS service can resolve the DNS query by transmitting network address information, or an alternative identifier, associated with the previously instantiated hosted virtual machine instance. In another aspect, if the previously instantiated hosted virtual machine instance is not instantiated and otherwise not available to process requests, the DNS service can initiate a process to cause an instantiation of a hosted virtual machine instance based on the previously instantiated hosted virtual machine instance. The DNS service can then resolve the DNS query by transmitting network address information, or an alternative identifier, associated with the newly instantiated hosted virtual machine instance.

Figure 1:
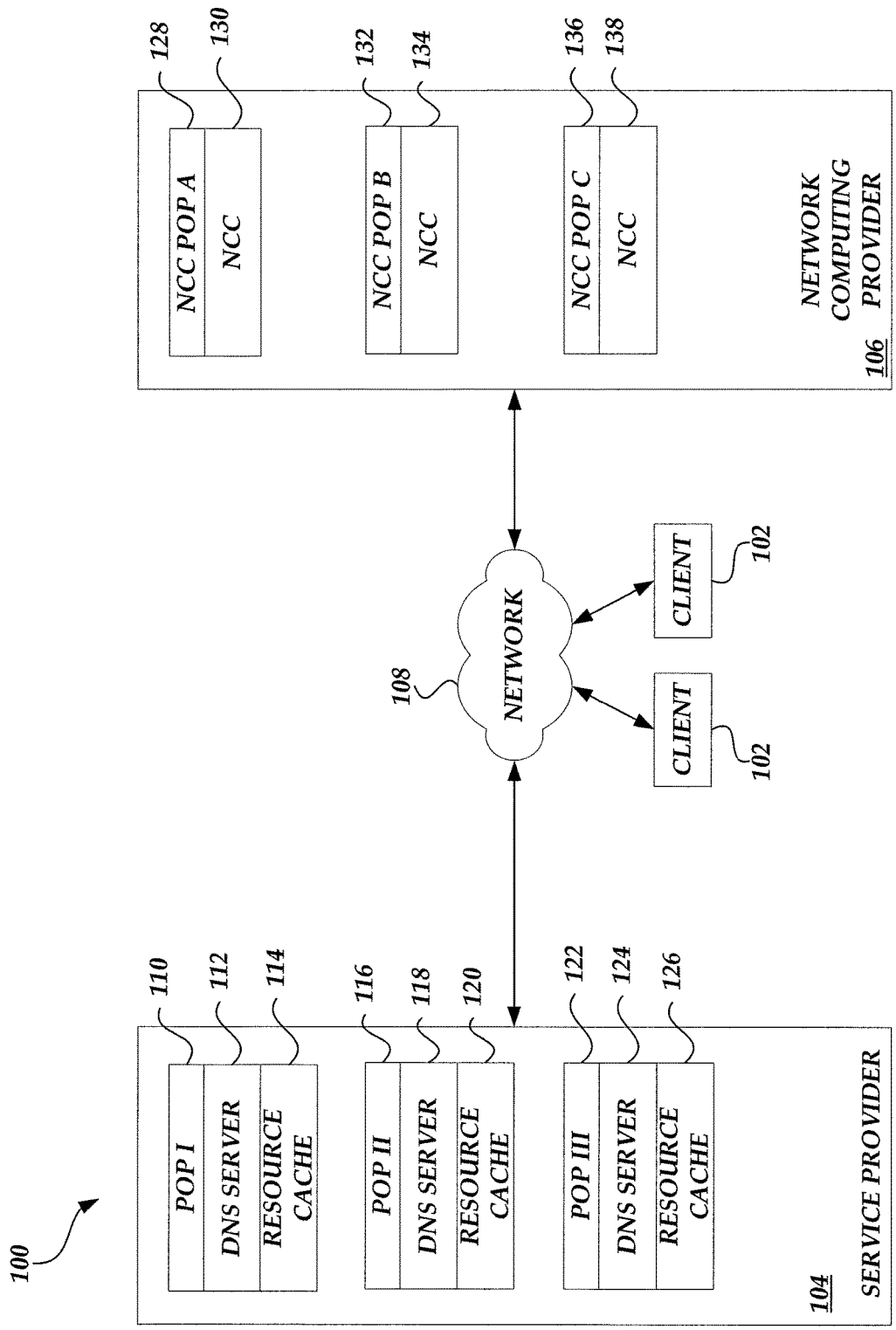
FIG. 1 is a block diagram illustrative of an environment for the management and processing of DNS queries related to hosted virtual machine instances.

FIG. 1 is a block diagram illustrative of an environment 100 for the management and processing of DNS queries related to hosted virtual machine instances. As illustrated in FIG. 1, the environment 100 includes a number of client computing devices 102 (generally referred to as clients) for transmitting requests to a service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

With continued reference to FIG. 1, the environment 100 can further include a service provider 104 in communication with the one or more client computing devices 102 to resolve DNS queries transmitted by the client computing devices via the communication network 108. The service provider 104 illustrated in FIG. 1 corresponds to a logical association of one or more computing devices associated with a DNS service provider. Specifically, the service provider 104 can include a number of Point of Presence ("POP") locations 110, 116, 122 that correspond to nodes on the communication network 108. Each POP 110, 116, 122 includes a DNS component 112, 118, 124 made up of a number of DNS server computing devices for resolving DNS queries from the client computers 102. Each POP 110, 116, 122 also includes resource cache components 114, 120, 126 for maintaining information related to status of various network computing components. The DNS components 112, 118, 124 may further include additional software and/or hardware components that facilitate communications including, but not limited to, load balancing or load sharing software/hardware components.

In an illustrative embodiment, the DNS component 112, 118, 124 and resource cache component 114, 120, 126 are considered to be logically grouped, regardless of whether the components, or portions of the components, are physically separate. Additionally, although the POPs 110, 116, 122 are illustrated in FIG. 1 as logically associated with the service provider 104, the POPs will be geographically distributed throughout the communication network 108 in a manner to best serve various demographics of client computing devices 102. Additionally, one skilled in the relevant art will appreciate that the service provider 104 can be associated with various additional computing resources, such additional computing devices for administration of content and resources, and the like.

With further continued reference to FIG. 1, the environment 100 can also include a network computing provider 106 in communication with the one or more client computing devices 102 and the service provider 104 via the communication network 108. The network computing provider 106 illustrated in FIG. 1 also corresponds to a logical association of one or more computing devices associated with a network computing and storage provider. Specifically, the network computing provider 106 can include a number of Point of Presence ("POP") locations 128, 132, 136 that correspond to nodes on the communication network 108. Each POP 128, 132, 136 includes a network computing component (NCC) 130, 134, 138 for hosting applications, such as data streaming applications, via a number of instances of a virtual machine, generally referred to as an instance of an NCC. As will be explained in greater detail, each virtual instances hosted by an NCC is associated with an identifier that can be used by the client computing devices 102.

One skilled in the relevant art will appreciate that NCC 130, 134, 138 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 128, 132, 136 may also include storage components made up of a number of storage devices. The NCCs 128, 132, 136 may further include additional software and/or hardware components that facilitate communications including, but not limited to, load balancing or load sharing software/hardware components for selecting instances of a virtual machine supporting a requested application or providing information to a DNS nameserver to facilitate request routing.

In an illustrative embodiment, NCCs 128, 132, 136 are considered to be logically grouped, regardless of whether the components, or portions of the components, are physically separate. Additionally, although the NCC POPs 128, 132, 136 are illustrated in FIG. 1 as logically associated with the network computing provider 106, the NCC POPs will be geographically distributed throughout the communication network 108 in a manner to best serve various demographics of client computing devices 102. Additionally, one skilled in the relevant art will appreciate that the network computing provider 106 can be associated with various additional computing resources, such additional computing devices for administration of content and resources, and the like. Even further, one skilled in the relevant art will appreciate that the components of the network computing provider 106 and components of the service provider 104 can be managed by the same or different entities.

With reference now to FIGS. 2-5B, the interaction between various components of the environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Illustratively, the interaction between a customer associated with a client computing device 102 and the network computing provider 106 begins with the registration of the client computing device 102 to access computing resources made available by the network computing provider 106. In one aspect, the registration process can include the exchange of business information typical in the establishment of an account, such as the exchange of financial information, establishment of desired service levels, configuration of the desired service, and the like. In another aspect, the registration process can include the generation of information utilized by the customer, via the client computing device 102, to access the desired service, such as account identifiers, passwords and information for accessing the service provider. In addition to the registration with the network computing provider 106, the customer can also register with the service provider 104 in order to allow the service provider 104 to process DNS queries for a domain with the computing resources made available by the network computing provider 106. As will be explained in greater detail, the registration with the service provider 104 will also configure the service provider 104 to manage computing resources made available by the network computing provider 106.

Figure 2:
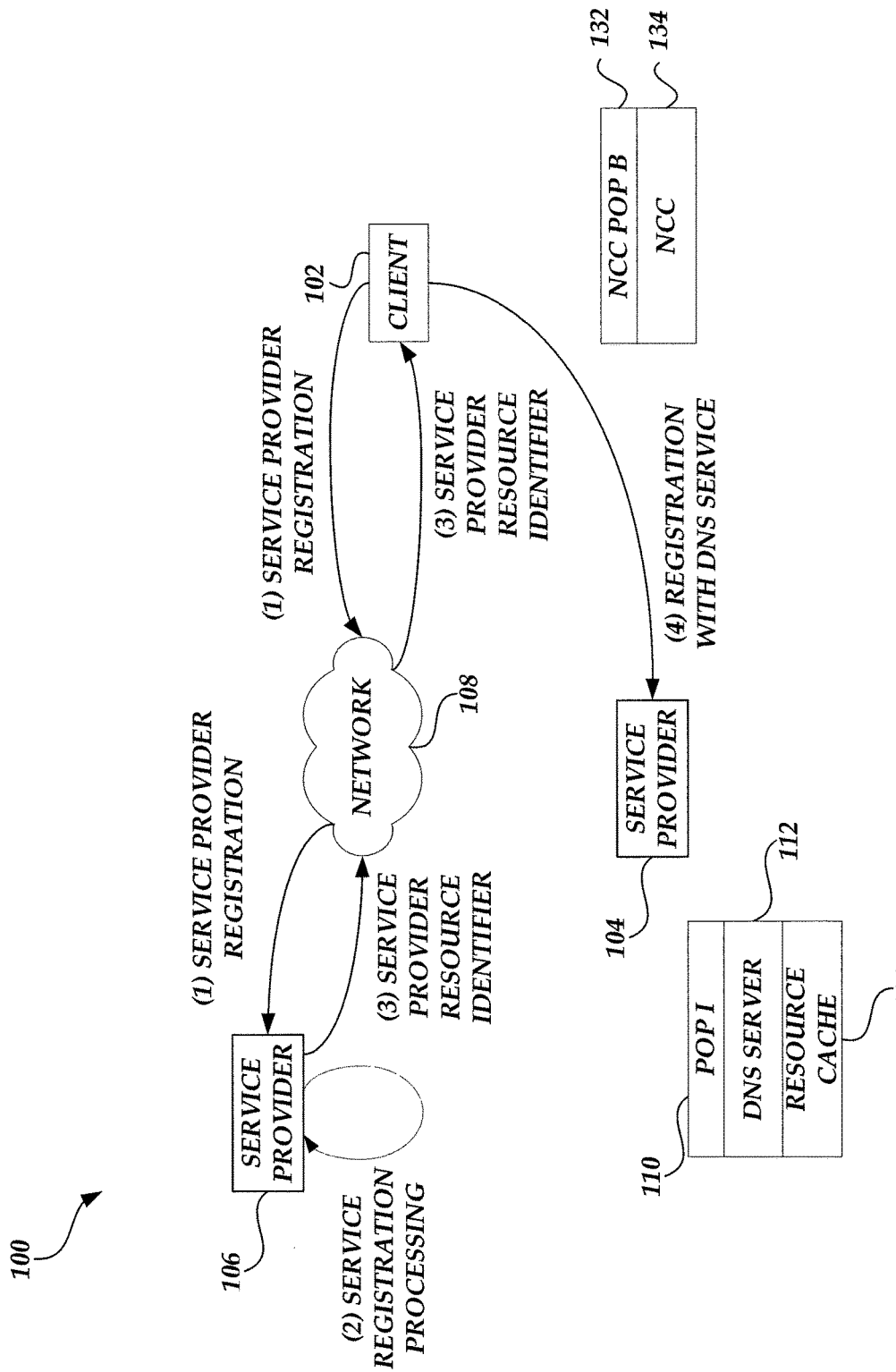
FIG. 2 is a block diagram of the environment of FIG. 1 illustrating the registration of client computing devices with a network computing provider.

In accordance with aspects of the present application, the client computing device 102 can access one or more computing devices associated with the network computing provider 106 by utilizing a resource identifier, such as uniform resource identifier ("URL") that will be used by, which will be generally referred to as a network computing provider URL. For purposes of an illustrative example, the network computing provider URL can be characterized into two portions. The first portion identifies a domain that will used to access the network computing provider resources. Illustratively, the domain can include, but is not limited to, a domain associated with a network computing provider 106 (e.g., networkcomputingprovider.com), a domain associated with a client computing device (e.g., anydomain.com), or a domain associated with a third party (e.g., third_party_domain.com). Additionally, the first portion of the network computing provider URL can also identify one or more specific types of devices or services associated with the identified domain (e.g., services or myapplication). The first portion of the network computing provider URL can be generally referred to as a DNS portion of the network computing provider URL. Additionally, a second portion of the network computing provider URL can also include additional information utilized in the processing and request of services ("extra_information"). In a first set of illustrative examples, the network computing provider URL has the form of:

http://services.network_computing_provider.com/extra_information http://myapplication.anydomain.com/extra_information In accordance with an illustrative embodiment, in addition to the above information, the first portion of the network computing provider URL (e.g., the DNS portion of the network computing provider URL) can also include additional information that will be used by a DNS query processing service to manage one or more virtual machine instances associated with the client computing device transmitting the DNS query. More specifically, the DNS portion of the network computing provider URL can include one or more identifiers, or other information, that can be used to associate the DNS query to one or more-instantiated virtual machine instances by the network computing provider associated with the domain (e.g., "unique_identifier"). In one embodiment, the unique identifier can correspond to an identifier utilized by the network computing provider 106 to manage previously instantiated computing resources. In another embodiment, the unique identifier can correspond to an identifier utilized by the network computing provider 106 to instantiate computing resources. Illustratively, the unique identifier can be unique to a single customer/client computing device 102 or unique to a set of customers or client computing devices 102. In this embodiment, the DNS server can parse the unique identifier information from the DNS portion of the network computing provider URL and utilize the identifier, or identifiers, to manage virtual machine instances, as will be described. In other illustrative examples, the network computing provider URL has the form of:

http://unique_identifier.services.network_computing_provider.com/extra_information http://unique_identifier.myapplication.mydomain.com/extra_information In accordance with further embodiments, in addition to the above information, the first portion of the network computing provider URL can also include additional information that will be used by a DNS query processing service as part of a request routing processes to identify one or more NCC POPs that may be best suited to service requests from the client computing devices 102. More specifically, the DNS portion of the network computing provider URL can include one or more identifiers, or other information, that can be used by the DNS server to identify which NCC POP may be best suited to process the client computing device requests (e.g., "routing_information"). The additional information can be combined with the unique identifiers included in the network computing provider URL or independent of any unique identifiers included in the network computing provider URL. Illustratively, the "routing_information" can directly or indirectly identify service level information related to a desired service level, financial information related to a financial cost to be incurred as part of the request routing service, preferred routing algorithms, geographic identifiers, preferred POPs, and the like. Illustratively, the DNS server can parse the routing_information from the DNS portion of the network computing provider URL and utilize the routing_information as part of a request routing algorithm. In this illustrative example, the network computing provider URL has the form of:

http://routing_information.unique_identifier.services.network_computing_provider.com/extra_information http://routing_inrormation.myapplication.mydomain.com/extra_information Turning now to FIG. 2, an illustrative interaction for the registration of client computing devices 102 with a network computing provider 106 will be described. At (1), the client computing device 102 initiates the registration process by transmitting a request to the network computing provider 106. In one embodiment, the transmission of the request can correspond to the generation of various user interfaces to collect information from the customer associated with the client computing device 102 and transmit the collected information in accordance with an Application Protocol Interface ("API"). In other embodiments, the client computing device 102 may be configured to obtain or transmit information to the network computing provider 106 via an API without the need to generate user interfaces.

At (2), the network computing provider 106 obtains the registration request and processes the request to establish the requested account, update an existing account or otherwise establish the availability of the service for the customer. As will be explained in greater detail, the processing of the request can include the generation of the network computing provider URL, the one or more identifiers, including the unique identifier, that will be used as part of the network computing provider URL or that will be associated with the network computing provider URL. As previously described, in one embodiment, the registration process with the network computing provider 106 corresponds to the generation of a unique identifier that can be used by the network computing provider 106 to manage one or more computing resources instantiated on behalf of the customer/client computing device 102. For example, in this embodiment, the unique identifier can be used to determine whether previously instantiated virtual machine instances are available for further processing or to cause the re-instantiation of previously instantiated virtual machine instances.

In another embodiment, the registration process with the network computing provider 106 corresponds to the generation of a unique identifier that defines one or more attributes of computing devices resources that can be instantiated on behalf of the customer/client computing device 102. In this embodiment, the unique identifier can be utilized to cause the initial instantiation of the computing resources, such as one or more virtual machine instances. Illustratively, the registration process for the instantiation of computing device resources can include, but is not limited to, the specification of various hardware and software parameters for the computing device resources (physical or virtual), the configuration of various parameters (communication, security, etc.), the specification of financial cost parameters, the specification of service level agreements, and the like. Such unique identifiers may be selected from a pre-existing set of identifiers or may represent a unique configuration.

At (3), the service provider 106 transmits the network computing provider URL, unique identifiers, or a portion thereof, to the client computing device 106. The transmission can also include additional confirmation information or other information that may be used by the client computing device 102 to communicate with the service provider 106 or requests services from the network computing provider 106.

At (4), the receiving client computing device 102 then transmits a registration request with the service provider 104 to associate a network computing provider URL with one or more instance identifiers provided by the network computing provider 106. In one embodiment, the registration with the service provider 104 can correspond to a request for the service provider 104 to function as DNS query processing authority for one or more network computing provider URLs. In another embodiment, the service provider 104 may already function as the DNS query processing authority for the network computing provider URL. Accordingly, the request can corresponds to the association of the unique identifiers provides by the network computing provider 106 with the network computing provider URL. In still other embodiments, if the network computing provider URL corresponds to a domain not controlled by the client computing device 102 (e.g., serviceprovider.com), the service provider 104 may function as the DNS query processing authority for the network computing provider URL. Accordingly, the request can corresponds to the association of the unique identifiers provides by the network computing provider 106 with the network computing provider URL.

Figure 3A:
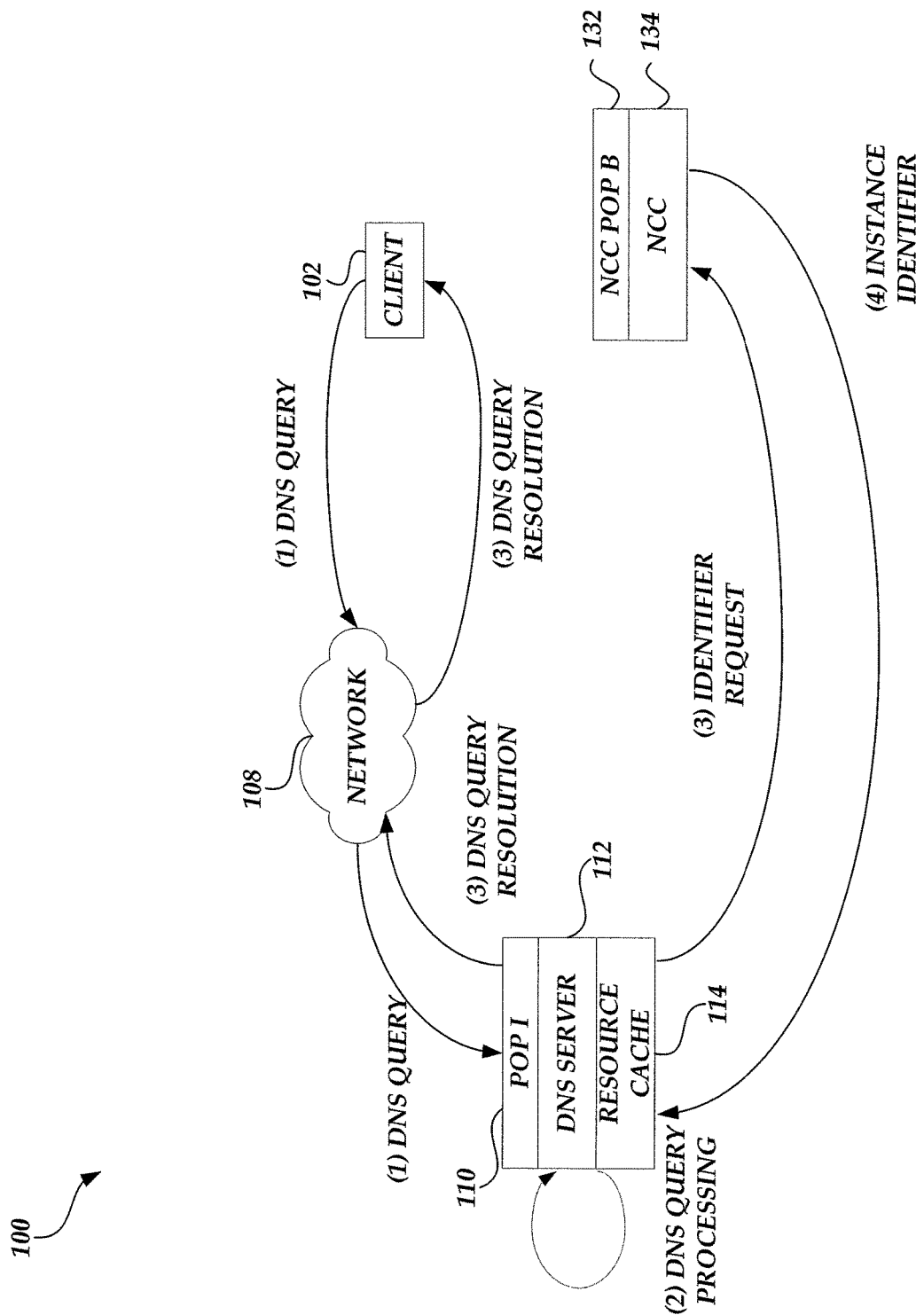
FIG. 3A is a block diagram of the environment of FIG. 1 illustrating the processing of a DNS query related to an initial request for instantiation of a hosted virtual machine instance by the network computing provider on behalf of a client computing device.

With reference to FIG. 3A, an illustrative interaction for the eventual transmission of a service request, such as request for the initiation of a hosted virtual machine instance by the network computing provider 106 on behalf of a client computing device 102. For purposes of an illustrative example, the interaction illustrated in FIG. 3A occurs at some point in time after the registration of the client computing device 102 with the network computing provider 106 and service provider 104 is complete, or otherwise, responsive to the completion of the registration process as illustrated in FIG. 2. As illustrated in FIG. 3A, the process begins at (1) with the transmission of a DNS query by a client computing device 102 to the service provider 104 to identify a network address of a particular NCC associated with the service provider 106. Illustratively, the DNS query corresponds to the network computing provider URL previously provided to the client computing device 102 during the registration process (FIG. 2).

One skilled in the relevant art will appreciate that the processing of a DNS query would begin with the identification of a DNS server authoritative to the "." and the "com" portions of the translated URL. The issuance of DNS queries corresponding to the "." and the "com" portions of a URL are well known and have not been illustrated. Accordingly, as illustrated in FIG. 3A, after resolving DNS queries associated with the "." and "com" portions of the network computing provider URL, the client computing device 102 then issues a DNS query for the network computing provider URL that results in the identification of a DNS server authoritative to the portion of the network computing provider URL, in this example one of the DNS server components 112 at POP 110 associated with service provider 104

At (2), the DNS server component 112 parses the DNS query to obtain any identifier (or other information) transmitted in the DNS portion of the network computing provider URL. At (3), the DNS server component 112 at service provider 104 resolves the DNS query by identifying either a network address of an NCC component or an alternative identifier that will be utilized to identify an appropriate NCC component. Illustratively, because the DNS server component 112 receives an initial DNS query that includes unique identifier in the DNS portion of the network computing provider URL that has not been previously utilized, the DNS server component maintains information associating the unique identifier a specific network address utilized to resolve the DNS query and an identifier of the specific instance of the network computing provider 106. Accordingly, at (4), the service provider 104 transmits and receives instance identification information based on a DNS query at (5). At (6), the DNS query is resolved by transmitting the above information to the client computing device 102. One skilled in the relevant art will appreciate that the resolution of the DNS query and the maintenance of the mapping of network addresses to network computing provider 106 identifiers can occur in a different order than the order illustrated in FIG. 3A.

In an illustrative embodiment, one or more DNS components of the service provider 104 maintain tables that associate the network computing provider URL, any unique identifiers in the network computing provider URL, or combination thereof with network addresses and other identifiers associated with the NCC components of the network computing provider 106. Additionally, the DNS components of the service provider 104 can also maintain various routing information, preferences or other information that were utilized in previous request routing processes. The tables can then be utilized in processing subsequent DNS queries. In one embodiment, the table is maintained individually by one or more DNS components of the service provider 104. In other embodiments, the table (or tables) may be distributed among a select subset of the DNS components in accordance with one or more distribution schemes implemented by the service provider 104.

Table 1 illustrates an illustrative embodiment of a portion of a table utilized by a DNS component of the service provider 104:

TABLE 1

| Unique Identifier | Unique Identifier | Network Address | Routing Information |
|---|---|---|---|
| unique_identifier 1 | 1-xxx | 123.45.678.90 | None |
| any domain.com | 5-xxx | 345.78.910.11 | service level |
| . . . | . . . | . . . | . . . |
| unique_identifier x1 | 67-xxx | 444.33.890.12 | cost information |

Table 2 illustrates another illustrative embodiment of a portion of a table utilized by a DNS component of the service provider 104 in which computing. As illustrated in Table 2, the first two entries in Table 2 correspond to examples in which computing device resources have not been instantiated by the network computing provider 106 on behalf of the customer/client computing device 102.

TABLE 2

| Unique Identifier | Unique Identifier | Instance Identifier | Network Address | Routing Information |
|---|---|---|---|---|
| unique_identifier x yourdomain.com | | identifier x Identifier | | |
| ... | ... | | ... | ... |
| unique_identifier x1 | 67-xxx | | 444.33.890.12 | cost information |

One skilled in the art will appreciate that a table would not necessarily need to have the routing information associated with previous request routing information. Additionally, the tables may require more or less information depending on the relationship between the service provider 104 and the network computing provider 106.

Figure 3B:
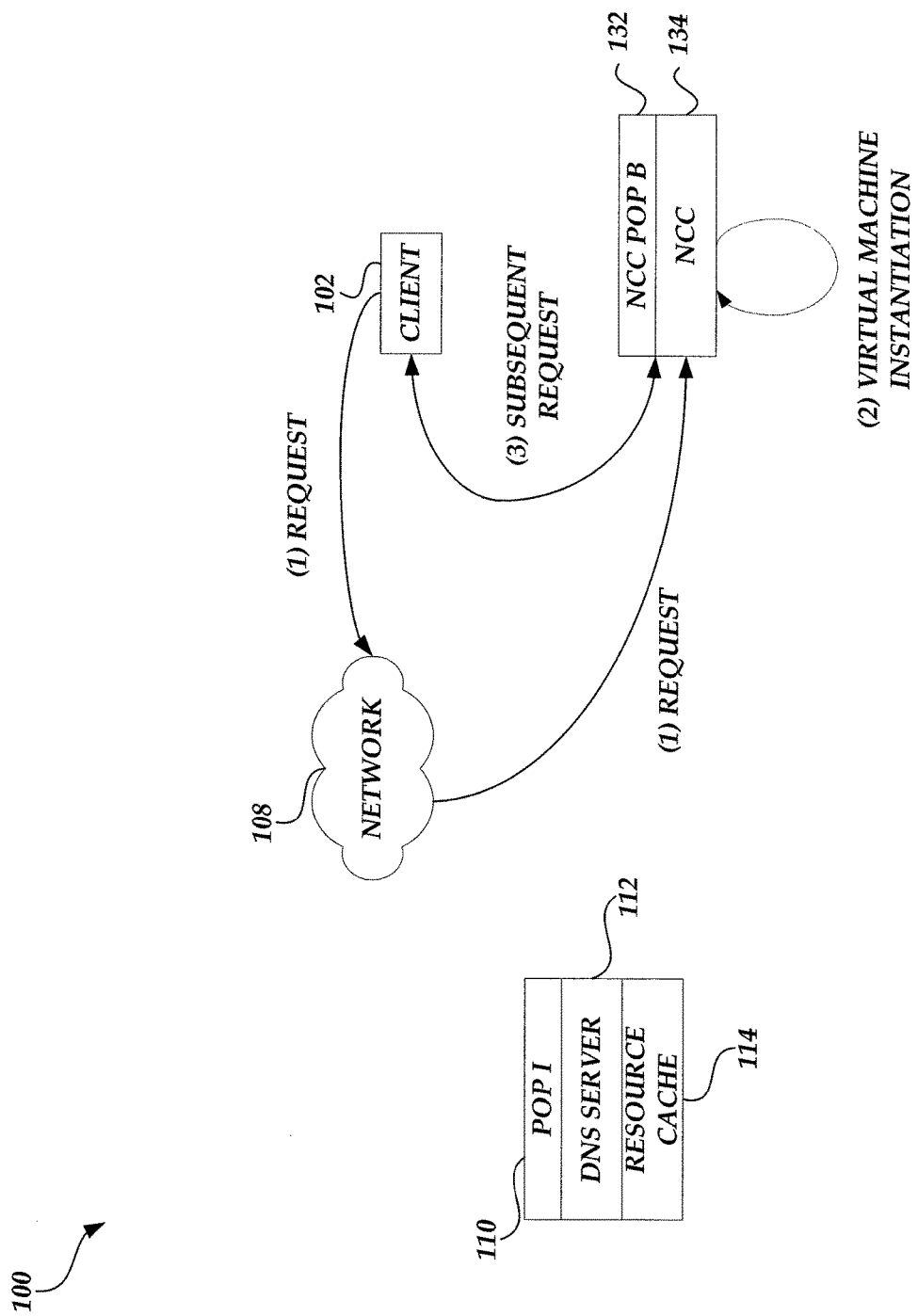
FIG. 3B is a block diagram of the environment of FIG. 1 illustrating an initial request for instantiation of a hosted virtual machine instance by the network computing provider on behalf of a client computing device.

Turning now to FIG. 3B, illustrating an initial request for instantiation of a hosted virtual machine instance by the network computing provider on behalf of a client computing device will be described. At (1), the client computing device 102 transmits a request to the network computing provider 106 associated with the resolved DNS query. At (2), the network computing provider 106 processes the request and instantiates one or more hosted virtual machines instances corresponding to the request. Additionally, at (3), the network computing provider 106 and client computing device 102 can begin interacting as the client computing device 102 interfaces with virtual machine instances hosted on the NCC 134.

Figure 4:
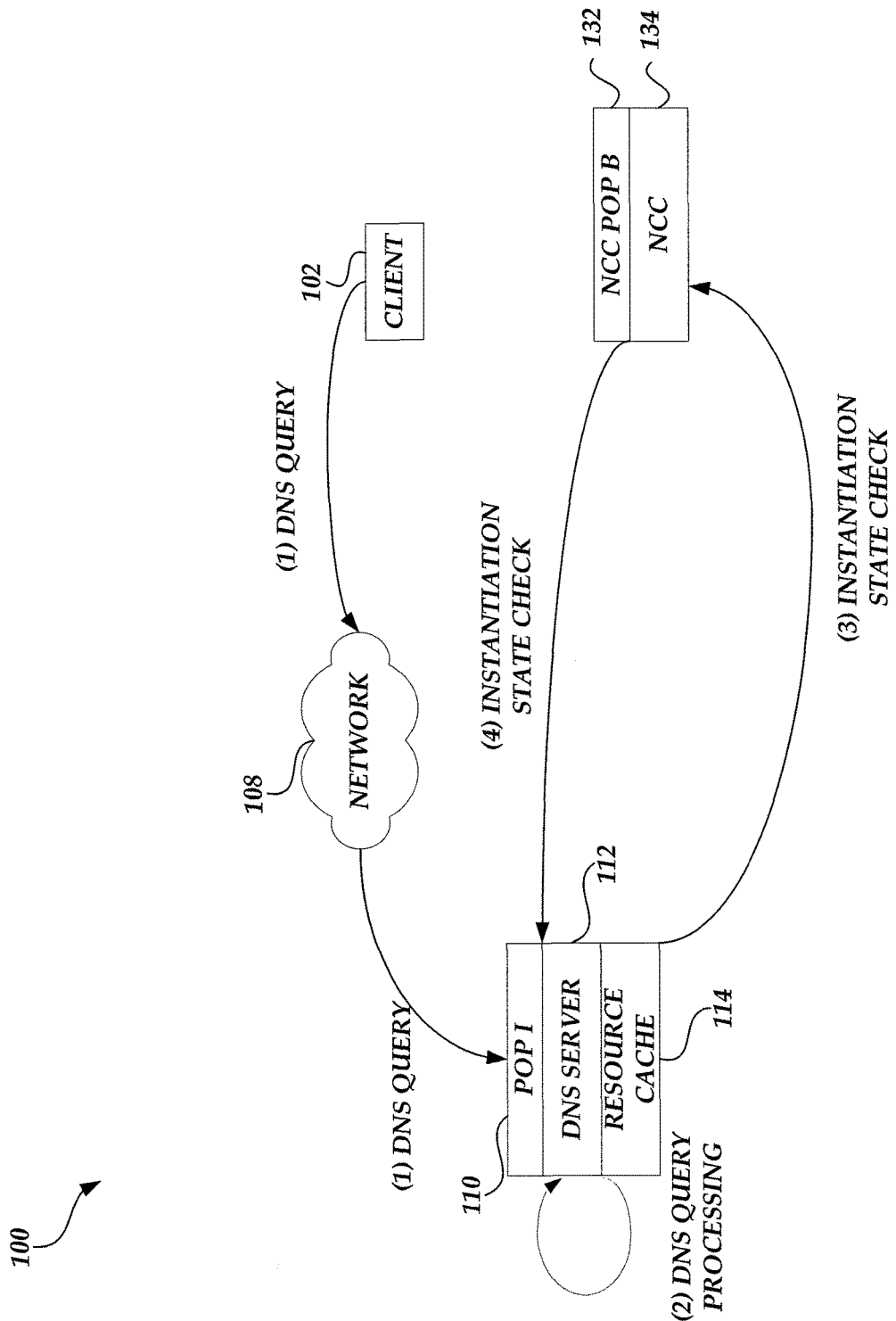
FIG. 4 is a block diagram of the environment of FIG. 1 illustrating the processing of a DNS query related to a subsequent request for access of a hosted virtual machine instance by the network computing provider on behalf of a client computing device.

With reference to FIG. 4, for purposes of an illustrative example, at some point, the client computing device 102 has ceased interaction with the NCC 132, at least temporarily. Depending on the time elapsed between interactions, the network computing provider 106 can either terminate a hosted instance, while maintaining information related to the state of the virtual machine instance prior to termination.

In one embodiment, to access the service again, the client computing device 102 initiates a subsequent DNS query to the service provider 104. As illustrated in FIG. 4, the process begins at (1) with the transmission of a DNS query by a client computing device 102 to the service provider 104. Illustratively, the client computing device 102 would utilize the same (or similar) network computing provider URL that was previously transmitted during the initial DNS query to the service provider 104 (FIG. 3A).

With continued reference now to FIG. 4, at (2), upon receipt of the DNS query, the DNS server parses the DNS query to obtain any identifier (or other information) associated with the previously instantiated hosted virtual machine. One skilled in the relevant art will appreciate that parsing the network computing provider URL can include parsing the "unique_identifier" information included in the DNS portion of the network computing provider URL. Alternatively, the DNS server may utilize all the DNS portion of the network computing provider URL as the "unique_identifier" portion, especially in embodiments in which no additional information is utilized for request routing is included in the DNS portion of the network computing provider URL. For example, the DNS server can utilize the identified domain (e.g., "anydomain.com") to recall the identifier.

At (3), the DNS server can then determine whether the previously instantiated hosted virtual machine is still instantiated and available to process a subsequent request from the client computing device 102. In one embodiment, the DNS server can transmit a request to the network computing provider 106 to determine in real time or substantially real time whether the network computing provider 106 has terminated the previously instantiated hosted virtual machine instance. For example, the DNS server 112 can reference a table that identifies the instance identifier with the unique_identifier included in the network computing provider URL and transmit a request to the network computing provider 106 as part of an API. In another embodiment, the network computing provider 106 can maintain information related to the instantiation state of a number of hosted virtual machine instances that can be polled. In this embodiment, the network computing provider 106 would periodically poll for the status of a set of hosted virtual machine instances or be informed when a previously instantiated virtual machine instance has been terminated.

TABLE 3

| Unique Identifier | Instance Identifier | Network Address | Routing Information | Status |
|---|---|---|---|---|
| unique_identifier 1 | 1-xxx | 123.45.678.90 | None | Active |
| unique_identifier 2 | 5-xxx | 345.78.910.11 | service level | Non-active |
| ... | ... | ... | ... | ... |
| unique_identifier x1 | 67-xxx | 444.33.890.12 | cost information | Active |

With reference to the previous example, Table 3 illustrates an embodiment in which the DNS server components maintain information related to whether one or more previously instantiated virtual machine instances remain active. Additionally, the DNS servers can maintain information related to whether the active virtual machine instances available to process a subsequent requests.

Figure 5A:
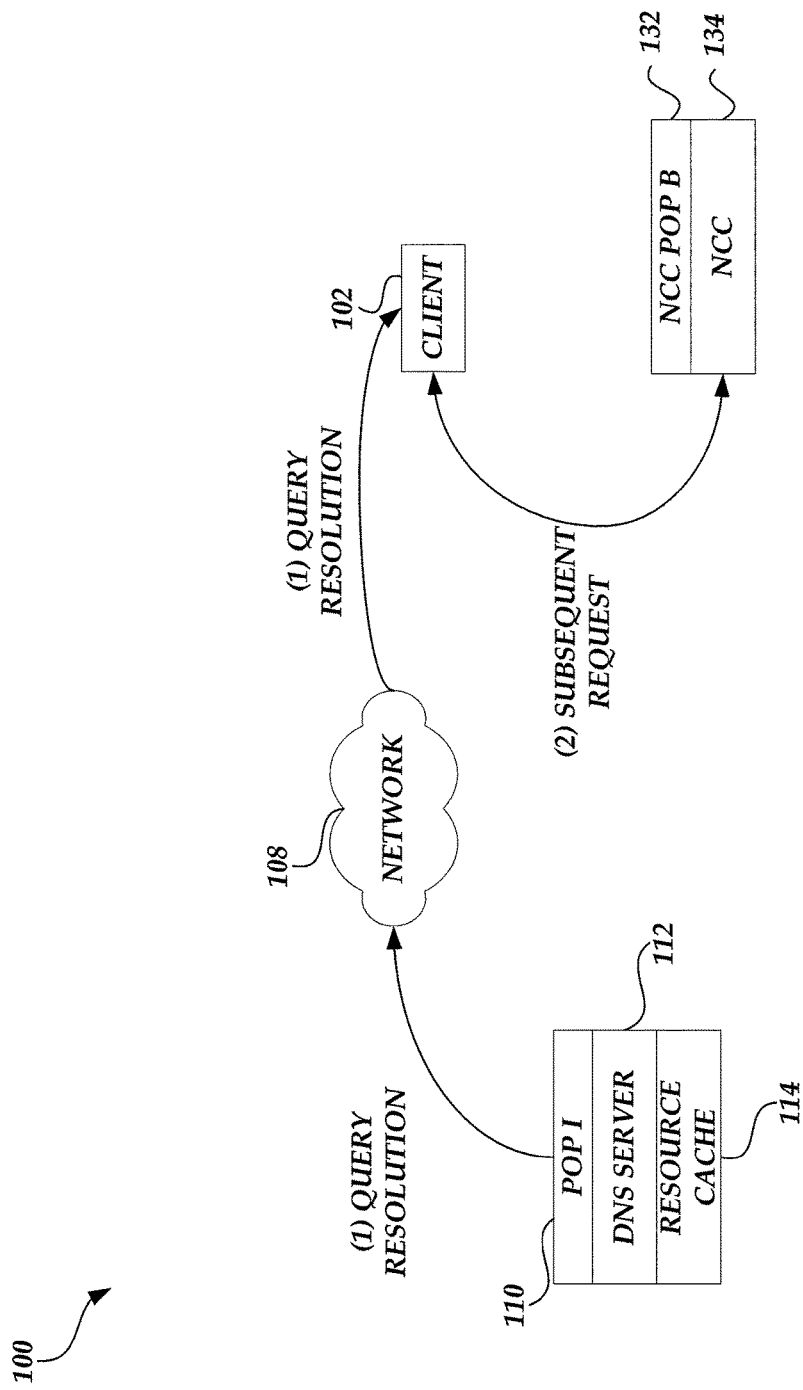
FIG. 5A is a block diagram of the environment of FIG. 1 illustrating the processing of a subsequent for access of a hosted virtual machine instance by the network computing provider on behalf of a client computing device.

With reference to FIG. 5A, if the previously instantiated hosted virtual machine instance is still instantiated and available to process subsequent requests, the DNS server can utilize network identifiers associated with the previously instantiated hosted virtual machine instance to resolve the DNS query. In one embodiment, at (1) the DNS server will resolve the DNS query by identifying the network address or an alternative identifier associated with the previously instantiated hosted virtual machine instance. At (2), the client computing device 102 utilizes the returned network address for the subsequent requests.

In an alternative embodiment, the DNS server may utilize additional request routing information to determine that a different virtual machine instance may be better suited to process the subsequent request by the client computing device 102. In one example, the processing of the request routing information may be indicative of lower cost estimates that may meet cost criteria for a different instantiated virtual machine instance of the network computing provider 106. In such embodiments, the DNS server 112 would transmit a request to instantiate a new hosted virtual machine instance in accordance with the request routing information.

In another example, the service provider 104 can utilize geographic criteria as additional request routing information. The geographic criteria can correspond to geographic-based regional service plans contracted between the service-provider 106 and the client computing device 102. Accordingly, a client computing device 102 DNS query received in a region not corresponding to the network computing provider 106's regional plan may be better processed by computing devices in a region corresponding to the network computing provider 106's regional plan.

In a further example, the service provider 104 can also analyze the DNS query according to service level criteria. The service level criteria can correspond to service or performance metrics contracted with the network computing provider 106. Examples of performance metrics can include latencies of data transmission between the service provider POPs and the client computing devices 102, total data provided on behalf of the network computing provider 106 by the service provider POPs, error rates for data transmissions, and the like.

In still a further example, the service provider 104 can process the DNS query according to network performance criteria. The network performance criteria can correspond to measurements of network performance for transmitting data from the service provider POPs to the client computing device 102. Examples of network performance metrics can include network data transfer latencies (measured by the client computing device or the network computing provider 106, network data error rates, and the like.

In yet a further example, the receiving DNS server process the DNS query for load balancing or load sharing purposes. The receiving DNS may obtain an identification of other POPs that define an order for such load balancing/load sharing. The list can be dynamic or periodically updated based on current network conditions.

Figure 5B:
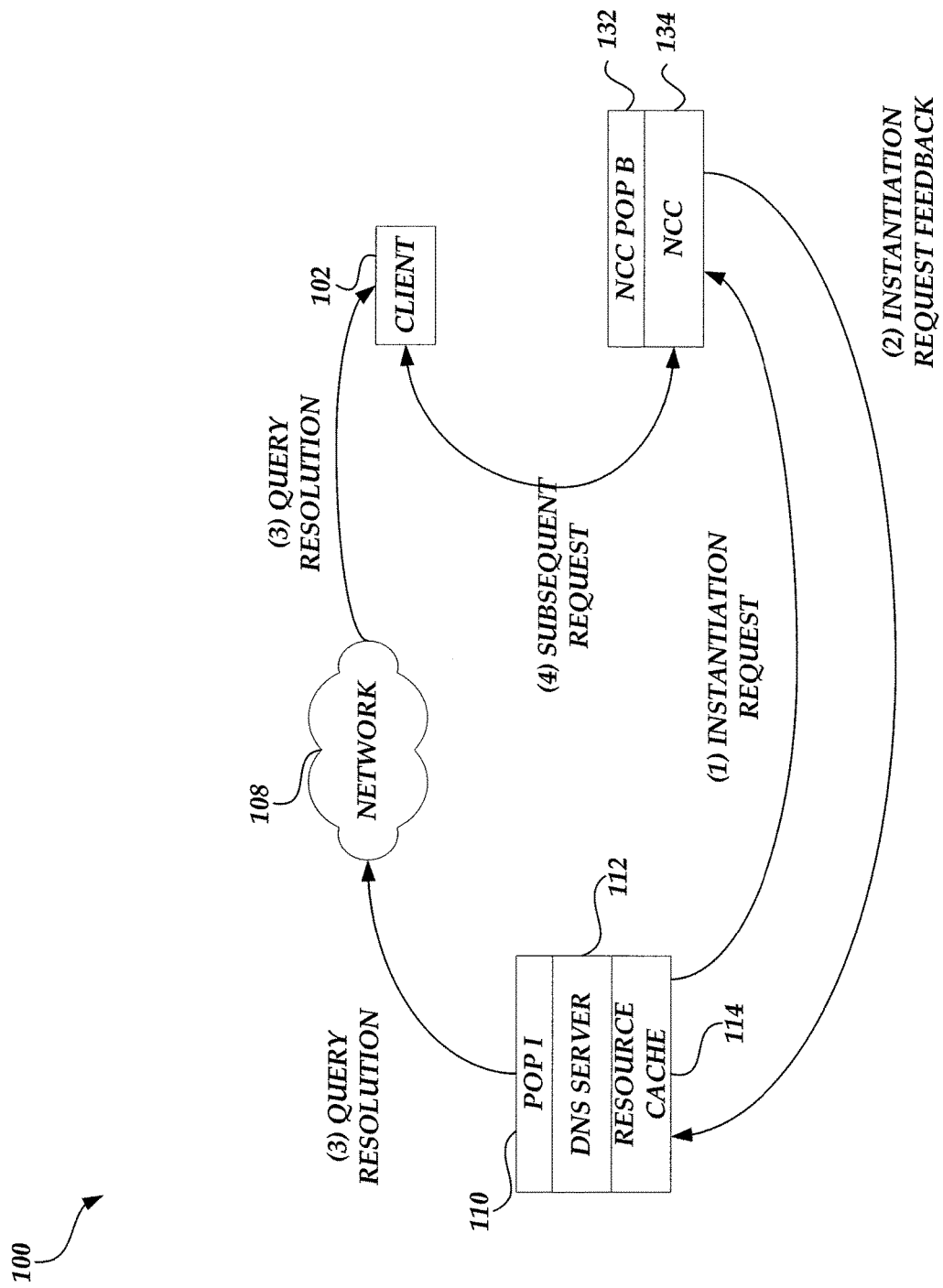
FIG. 5B is a block diagram of the environment of FIG. 1 illustrating the processing of a subsequent for access of a hosted virtual machine instance by the network computing provider on behalf of a client computing device.

With reference now to FIG. 5B, if the previously instantiated hosted virtual machine instance is not still instantiated and otherwise unavailable to process subsequent requests, the DNS server can cause the instantiation a new instance of the previously instantiated virtual machine instance. In one embodiment, at (1) the DNS server will transmit a request to instantiate a new version (e.g., "re-instantiate") of the hosted virtual machine instance. At (2), the NCC processes the requests and begins to instantiate a hosted virtual machine instance corresponding to the request. At (3), the DNS server transmits network identifiers for the re-instantiated hosted virtual machine instance. At (4), the DNS server resolves the DNS query by identifying the network address or an alternative identifier associated with the previously instantiated hosted virtual machine instance. At (5), the client computing device 102 utilizes the returned network address for the subsequent requests.

Figure 6:
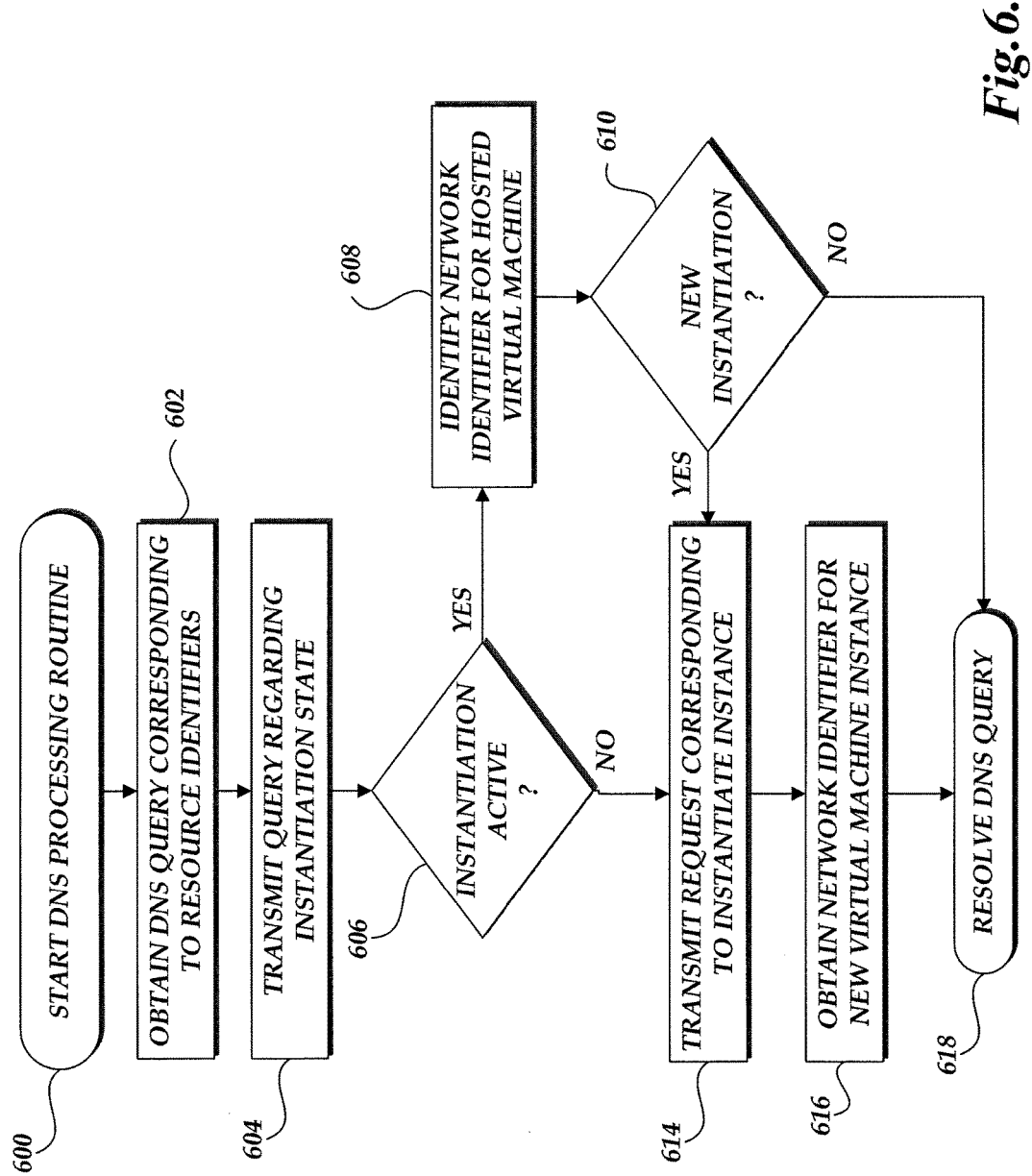
FIG. 6 is a flow diagram of a DNS query processing routine implemented by a DNS server.

With reference now to FIG. 6, a request routine 600 implemented by the service provider 104 to process DNS queries will be described. One skilled in the relevant art will appreciate that actions/steps outlined for routine 600 may be implemented by one or many computing devices/components that are associated with the service provider 104. Accordingly, routine 600 has been logically associated as being performed by the service provider 104.

At block 602, one of the DNS server components 112, 116, 122 receives a DNS query corresponding to a network computing provider URL. As previously discussed, the network computing provider URL includes an identifier corresponding a previously instantiated hosted virtual machine instance. The DNS portion of the network computing provider URL can be parsed to obtain the identifier. As previously discussed, in one embodiment, parsing of the DNS portion of the network computing provider URL can include parsing the "unique_identifier" information included in the DNS portion of the network computing provider URL. Alternatively, the DNS server may utilize all the DNS portion of the network computing provider URL as the "unique_identifier" portion, especially in embodiments in which no additional information utilized for request routing is included in the DNS portion of the network computing provider URL.

At block 604, the DNS server transmits a query to the network computing provider 106 to determine an instantiation state for a virtual machine instance associated with the unique identifier. Illustratively, the DNS server attempts to determine whether the previously instantiated hosted virtual machine is still instantiated and available to process a subsequent request from the client computing device 102. In one embodiment, the DNS server can transmit a request to the network service provider 106 to determine in real time or substantially real time whether the network computing provider 106 has terminated the previously instantiated hosted virtual machine instance or whether the hosted virtual machine instance is otherwise unavailable. For example, the DNS server can transmit a request including a hosted virtual machine identifier in accordance with an API.

In another embodiment, the DNS server components or a different component of the service provider 104 can maintain information related to the instantiation state of a number of hosted virtual machine instances that can be polled. In this embodiment, the service provider 104 would periodically poll for the status of a set of hosted virtual machine instances or be informed when a previously instantiated virtual machine instance has been terminated. Accordingly, the transmission of the query regarding the instantiation state may include internal queries to the information maintained by the DNS components (or other components), a transmittal to external components, or combination thereof.

At decision block 606, a test is conducted to determine whether the selected hosted virtual machine instance is active and available to process requests if the previously instantiated hosted virtual machine instance is still instantiated and available to process subsequent requests. Illustratively, decision block 606 can correspond to an initial determination of whether one or more virtual machine instances have been previously instantiated. If so, decision block 606 would further determine whether the selected hosted virtual machine instance is still instantiated and otherwise available to process subsequent requests. If the selected hosted virtual machine instance is active and available to process requests, at block 608, the service provider 104 identifies network identifiers associated with the previously instantiated hosted virtual machine instance to resolve the DNS query. By way of illustrative example, the DNS component of the service provider 104 can utilize the table that maintains the network address of the hosted virtual machine instance to use in the resolution of the DNS query.

At decision block 610, a test is conducted to determine whether the service provider 104 should utilize a new instantiation of a hosted virtual machine instance even if the previously hosted virtual machine instance may still be instantiated. As previously described, the DNS server may utilize additional request routing information to determine that a different virtual machine instance may be better suited to process the subsequent request by the client computing device 102. In another embodiment, the network computing provider 106 may indicate that while a virtual machine instance may still be active, the network computing provider 106 would like to migrate the virtual machine instance or otherwise initiate one or more additional virtual machine instances in the place of the current virtual machine instance. If a new instantiation is determined, the routine 600 proceeds to block 614, which will be described below. Alternatively, if no new instantiation is required, at block 618, the DNS server will resolve the DNS query by identifying the network address or an alternative identifier associated with the previously instantiated hosted virtual machine instance.

Returning to decision block 606, if the previously instantiated hosted virtual machine instance has not been previously instantiate or if a previously instantiated hosted virtual machine instance is not still instantiated based on management decisions by the network computing provider 106, or if a previously instantiated hosted virtual machine instances is otherwise unavailable to process subsequent requests, the DNS server can cause the instantiation a new instance of the previously instantiated virtual machine instance. At block 614, in one embodiment, the DNS server will transmit a request to instantiate a new version (e.g., "re-instantiate") of the hosted virtual machine instance. As previously discussed, the NCC processes the requests and begins to instantiate a hosted virtual machine instance corresponding to the request. In another embodiment, if the hosted virtual machine instance has not been previously instantiated (or was terminated by the customer), the DNS server will transmit a request to create a new instantiation of a hosted virtual machine instance. As previously discussed, the NCC processes the requests and begins to instantiate a hosted virtual machine instance corresponding to the request based on the configuration information maintained for by the DNS server. At block 616, the DNS server receives the network identifiers for the re-instantiated hosted virtual machine instance. At block 618, the DNS server resolves the DNS query by identifying the network address or an alternative identifier associated with the previously instantiated hosted virtual machine instance and the routine 600 terminates.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGS. should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a network point of presence (POP) associated with a content delivery network (CDN) service provider, wherein the network POP includes a domain name system (DNS) server that obtains a DNS query from a client computing device, wherein the DNS query comprises a uniform resource locator (URL), wherein the URL includes an identifier of a hosted virtual machine instance, wherein the identifier is included in a portion of a DNS portion of the URL, and wherein the DNS server in the network POP comprises hardware and is operative to:
   parse the DNS portion of the URL to obtain the identifier of the hosted virtual machine instance;
   transmit a request for a state of the hosted virtual machine instance to a service provider hosting the hosted virtual machine instance;
   obtain information corresponding to availability of the hosted virtual machine instance; and
   resolve the DNS query by transmitting, to the client computing device, information associated with the hosted virtual machine instance.

2. The system as recited in claim 1, wherein the DNS server is further operative to: determine that the hosted virtual machine instance is not instantiated; and transmit a request to re-instantiate the hosted virtual machine instance.

3. The system as recited in claim 2, wherein the DNS server is further operative to: obtain information corresponding to the re-instantiation of the hosted virtual machine instance.

4. The system as recited in claim 1, wherein parsing the DNS portion of the DNS query to obtain the identifier associated with the hosted virtual machine instance includes parsing a complete DNS portion of the DNS query.

5. The system as recited in claim 1, wherein parsing the DNS portion of the DNS query to obtain the identifier associated with the hosted virtual machine instance includes parsing a sub-portion of the DNS portion of the DNS query.

6. The system as recited in claim 1, wherein resolving the DNS query includes transmitting a canonical name record identifier associated with a service provider hosting the hosted virtual machine instance.

7. The system as recited in claim 1, wherein resolving the DNS query includes transmitting a network address associated with a service provider hosting the hosted virtual machine instance.

8. The system as recited in claim 1, wherein the DNS server in the network POP is operative to maintain, for a set of previously instantiated virtual machine instances, information related to an availability to process subsequent requests from the client computing device.

9. The system as recited in claim 8, wherein the DNS server in the network POP is operative to:
 periodically transmit requests related to an availability to process subsequent requests from the client computing device for the set of previously instantiated virtual machine instances;
 obtain updated information related to an availability to process subsequent requests from the client computing device for the set of previously instantiated virtual machine instances;
 update the information related to an availability to process subsequent requests from the client computing device responsive to the updated information;
 obtain a request from the client computing device for the requested content; and
 process and transmit the requested content from the selected network computing component in response to the request from the client computing device.

10. A method comprising:
 obtaining, by a domain name system (DNS) processing service, a DNS query from a client computing device, wherein the DNS query comprises a uniform resource locator (URL), wherein the URL includes an identifier of a hosted virtual machine instance, and wherein the identifier is included in a DNS portion of the URL;
 parsing, by the DNS processing service, the DNS portion of the URL to obtain the identifier of the hosted virtual machine instance;
 transmitting, by the DNS processing service, a request for a state of the hosted virtual machine instance to a service provider hosting the hosted virtual machine instance;
 obtaining, by the DNS processing service, information corresponding to availability of the hosted virtual machine instance; and
 resolving, by the DNS processing service, the DNS query by transmitting, to the client computing device, information associated with the hosted virtual machine instance.

11. The method as recited in claim 10, wherein parsing the DNS portion of the DNS query to obtain the identifier associated with the hosted virtual machine instance includes parsing a complete DNS portion of the DNS query.

12. The method as recited in claim 10, wherein parsing the DNS portion of the DNS query to obtain the identifier associated with the hosted virtual machine instance includes parsing a sub-portion of the DNS portion of the DNS query.

13. The method as recited in claim 10, wherein resolving the DNS query includes transmitting a canonical name record identifier associated with a service provider hosting the hosted virtual machine instance.

14. The method as recited in claim 10, wherein resolving the DNS query includes transmitting a network address associated with a service provider hosting the hosted virtual machine instance.

15. The method as recited in claim 10 further comprising maintaining, for a set of previously instantiated virtual machine instances, information related to an availability to process subsequent requests from the client computing device.

16. The method as recited in claim 15 further comprising:
 periodically transmitting requests related to an availability to process subsequent requests from the client computing device for the set of previously instantiated virtual machine instances;
 obtaining updated information related to an availability to process subsequent requests from the client computing device for the set of previously instantiated virtual machine instances;
 updating the information related to an availability to process subsequent requests from the client computing device responsive to the updated information;
 obtaining a request from the client computing device for the requested content; and
 processing and transmit the requested content from the selected network computing component in response to the request from the client computing device.

17. A system comprising:
 a network point of presence (POP) associated with a content delivery network (CDN) service provider, wherein the network POP includes a DNS server that obtains a DNS query from a client computing device, wherein the DNS query comprises a uniform resource locator (URL), wherein the URL includes an identifier of a hosted virtual machine instance, wherein the identifier is included in a portion of a DNS portion of the URL, and wherein the DNS server in the network POP comprises hardware and is operative to:
  transmit a request for a state of the hosted virtual machine instance to a service provider hosting the hosted virtual machine instance;
  obtain information corresponding to availability of the hosted virtual machine instance; and
  resolve the DNS query by transmitting, to the client computing device, information associated with the hosted virtual machine instance.

18. The system as recited in claim 17, wherein the DNS server in the network POP is operative to: evaluate the URL to obtain the identifier associated with the hosted virtual machine instance.

19. The system as recited in claim 17, wherein resolving the DNS query includes transmitting a canonical name record identifier associated with a service provider hosting the hosted virtual machine instance.

20. The system as recited in claim 17, wherein resolving the DNS query includes transmitting a network address associated with a service provider hosting the hosted virtual machine instance.

21. The system as recited in claim 17, wherein the DNS server in the network POP is operative to: maintain, for a set of previously instantiated virtual machine instances, information related a current instantiation state for the set of previously instantiated virtual machine instances.

22. The system as recited in claim 21, wherein the DNS server in the network POP is operative to:
- periodically transmit requests related an instantiation state for the set of previously instantiate virtual machine instances;
- obtain updated information related instantiation state for the set of previously instantiate virtual machine instances; and
- update the information related to the instantiation state for the set of previously instantiate virtual machine instances.

* * * * *

UNITED STATES PATENT AND TRADEMARK OFFICE
CERTIFICATE OF CORRECTION

| | |
|---|---|
| PATENT NO. | : 10,374,955 B2 |
| APPLICATION NO. | : 15/935615 |
| DATED | : August 6, 2019 |
| INVENTOR(S) | : André Mostert |

It is certified that error appears in the above-identified patent and that said Letters Patent is hereby corrected as shown below:

On the Title Page

Page 11, Column 2, Line 17 (Item (56)), under Other Publications, change "UltraSP ARC" to --UltraSPARC--.

Page 12, Column 1, Line 37 (Item (56)), under Other Publications, change "Ioannidis," to --Loannidis,--.

Page 12, Column 2, Line 20 (Item (56)), under Other Publications, change "-cc509.pdf;" to -- -ccs09.pdf;--.

In the Specification

Column 6, Line 17, change "routing_information" to --routing information--.

Column 6, Line 19, change "routing_information" to --routing information--.

Column 6, Line 24, change "_inrormation." to --_information.--.

Column 8, Line 3, after "104" insert --.--.

In the Claims

Column 16, Line 66, in Claim 21, change "related a" to --related to a--.

Column 17, Line 3, in Claim 22, after "related" insert --to--.

Column 17, Line 6, in Claim 22, after "related" insert --to the--.

Signed and Sealed this
Twelfth Day of May, 2020

Andrei Iancu
*Director of the United States Patent and Trademark Office*